United States Patent
Jang et al.

(10) Patent No.: US 10,055,056 B2
(45) Date of Patent: Aug. 21, 2018

(54) DISPLAY DEVICE, TOUCH SENSING CIRCUIT, AND DRIVING METHOD

(71) Applicant: LG Display Co., Ltd., Seoul (KR)

(72) Inventors: Hoon Jang, Goyang-si (KR); SoonDong Cho, Gumi-si (KR); Wonyong Jang, Bucheon-si (KR)

(73) Assignee: LG Display Co., Ltd., Seoul (KR)

(*) Notice: Subject to any disclaimer, the term of this patent is extended or adjusted under 35 U.S.C. 154(b) by 153 days.

(21) Appl. No.: 15/167,341

(22) Filed: May 27, 2016

(65) Prior Publication Data
US 2017/0192608 A1 Jul. 6, 2017

(30) Foreign Application Priority Data
Dec. 31, 2015 (KR) .................. 10-2015-0190726

(51) Int. Cl.
*G09G 3/36* (2006.01)
*G09G 3/3275* (2016.01)
*G06F 3/041* (2006.01)
*G06F 1/32* (2006.01)
*G06F 3/044* (2006.01)

(52) U.S. Cl.
CPC .......... *G06F 3/0418* (2013.01); *G06F 1/3262* (2013.01); *G06F 3/044* (2013.01); *G06F 3/0412* (2013.01); *G06F 2203/04102* (2013.01); *G06F 2203/04103* (2013.01)

(58) Field of Classification Search
CPC .... G06F 1/3262; G06F 3/0412; G06F 3/0418; G06F 3/044; G06F 2203/04102; G06F 2203/04103
See application file for complete search history.

(56) References Cited

U.S. PATENT DOCUMENTS

| | | | |
|---|---|---|---|
| 7,876,058 B2* | 1/2011 | Price | H05B 41/282 315/169.3 |
| 2012/0289147 A1* | 11/2012 | Raleigh | H04L 67/2847 455/3.06 |
| 2014/0057681 A1 | 2/2014 | Grivas et al. | |
| 2014/0181549 A1* | 6/2014 | Chueh | G06F 1/3203 713/320 |
| 2015/0193070 A1 | 7/2015 | Tilak et al. | |
| 2017/0090615 A1* | 3/2017 | Bohannon | G06F 3/044 |

OTHER PUBLICATIONS

GB Combined Search and Examination Report, GB Application No. 1622424.8, dated Jul. 4, 2017, 7 pages.

* cited by examiner

*Primary Examiner* — Charles Hicks
(74) *Attorney, Agent, or Firm* — Fenwick & West LLP

(57) ABSTRACT

The present embodiments relate to a display device, a touch sensing circuit, and a driving method, and more specifically, to a display device, a touch sensing circuit, and a driving method, which may: detect the power mode; create touch driving signals that have different amplitudes depending on the detected power mode; and drive touch electrodes for sensing the touch by using the created touch driving signals in order to thereby provide a high touch sensitivity regardless of the type of power mode.

21 Claims, 21 Drawing Sheets

220

DISPLAY DEVICE, TOUCH SENSING CIRCUIT, AND DRIVING METHOD

CROSS REFERENCE TO RELATED APPLICATION

This application claims priority from and the benefit under 35 U.S.C. § 119(a) of Korean Patent Application No. 10-2015-0190726, filed on Dec. 31, 2015, which is hereby incorporated by reference for all purposes as if fully set forth herein.

BACKGROUND

1. Field of the Invention

The present embodiments relate to a display device, a touch sensing circuit, and a driving method.

2. Description of the Related Art

With the development of the information society, demand is growing for display devices in a variety of forms in order to display images. In recent years, various display devices have been utilized, such as a liquid crystal display device (LCD), a plasma display panel (PDP), or an organic light emitting display device (OLED).

Such display devices include display devices {such as, laptop computers, tablets, or smart phones (i.e., mobile devices)} that provide a touch sensing function and adopt two or more power supply means, such as a battery and an adapter.

These display devices are supplied with power from any one of two or more power supply means in order to thereby perform a touch sensing operation.

However, the conventional display devices exhibit a phenomenon in which the touch sensitivity is significantly different depending on which power supply means supplies the power during the touch sensing operation.

In particular, the supply of the power from the battery brings about a significant reduction in the touch sensitivity during the touch sensing operation compared to the supply of the power through the adapter.

SUMMARY

The present embodiments may provide a touch drive that is differentiated according to the power mode in order to thereby improve the touch sensitivity.

In addition, the present embodiments may prevent the degradation of the touch sensitivity when the power mode corresponds to the battery mode.

Furthermore, the present embodiments may improve the touch sensitivity through an adaptive touch drive when the power mode is changed.

In one embodiment, a display device comprises a display panel having one or more touch electrodes embedded therein. A driving circuit of the display device includes a first circuit to generate a touch driving signal at an output of the first circuit. At the output of the first circuit the touch driving signal has a first amplitude during a first power mode and a second amplitude different than the first amplitude during a second power mode. A second circuit of the driving circuit has an input coupled to the output of the first circuit and that provides the touch driving signal to the one or more touch electrodes.

In one embodiment, the first power mode is a battery power mode and the second power mode is an adapter power mode. The first amplitude of the touch driving signal at the output of the first circuit during the battery power mode is greater than the second amplitude of the touch driving signal at the output of the first circuit during the adapter power mode.

In one embodiment, the display device includes a backlight driver having an input power voltage. The first power mode corresponds to when the input power voltage is a first voltage level, and the second power mode corresponds to when the input power voltage is a second voltage level different than the first voltage level.

In one embodiment, when the display device switches from the first power mode to the second power mode, the first circuit initially generates the touch driving signal to have, at the output of the first circuit, an intermediate amplitude between the first amplitude and the second amplitude, and then generates the pulse signal to have the second amplitude at the output of the first circuit. When the display device switches from the second power mode to the first power mode, the first circuit initially generates the touch driving signal to have the intermediate amplitude at the output of the first circuit, and then generates the touch driving to have the first amplitude at the output of the first circuit.

In one embodiment, the first circuit controls an amplitude of the touch driving signal based on an amplitude control signal. The display device also comprises a third circuit that detects whether the display device is in the first power mode or the second power mode, and generates the amplitude control signal based on whether the display device is in the first power mode or the second power mode. The third circuit detects whether the display device is in the first power mode or the second power mode based on an input power voltage of a backlight driver.

In one embodiment, the second circuit comprises an amplifier including a first terminal electrically connected with the touch electrode, a second terminal to receive the touch driving signal, and an output terminal; an integrator circuit configured to output an integral value of a voltage of the output terminal; and an analog-to-digital converter configured to convert an output voltage of the integrator circuit into a digital value, wherein the third circuit generates the amplitude control signal further based on the digital value.

In one embodiment, the second circuit comprises an amplifier including a first terminal electrically connected with the touch electrode, a second terminal to receive the touch driving signal, and an output terminal; a feedback capacitor connected between the first terminal and the output terminal; an integrator circuit configured to output an integral value of a voltage of the output terminal; and an analog-to-digital converter configured to convert an output voltage of the integrator circuit into a digital value, wherein the third circuit generates the capacitance control signal for controlling the capacitance of the feedback capacitor.

In one embodiment, the second circuit comprises an amplifier including a first terminal electrically connected with the touch electrode, a second terminal to receive the touch driving signal, and an output terminal; an integrator circuit configured to output an integral value of a voltage of the output terminal; and an analog-to-digital converter configured to convert an output voltage of the integrator circuit into a digital value, wherein the third circuit generates an integrator control signal for controlling a number of integration times of the integrator circuit.

In one embodiment, the second circuit comprises an amplifier including a first terminal electrically connected with the touch electrode, a second terminal to receive the touch driving signal, and an output terminal; an integrator circuit configured to output an integral value of a voltage of the output terminal; and an analog-to-digital converter configured to convert an output voltage of the integrator circuit into a digital value, wherein the third circuit adds a correction value to a sensed value output from the analog-to-digital converter to generate a corrected sensed value and generates touch coordinates based on the corrected sensed value, the correction value generated to have a first value during the first power mode and a second value during the second power mode.

According to an aspect, the present embodiments may provide a display device that may include: a display panel having a plurality of touch electrodes embedded therein; a touch circuit configured to sequentially output touch driving signals for driving the plurality of touch electrodes; and a touch power integrated circuit configured to create touch driving signals, which have different amplitudes depending on the power mode, and supply the same to the touch circuit.

According to another aspect, the present embodiments may provide a touch sensing circuit that may include: a power mode recognition unit configured to detect the power mode; and a control unit configured to output an amplitude control signal enabling creation of touch driving signals that have different amplitudes depending on the power mode.

According to still another aspect, the present embodiments may provide a driving method of a display device, which may include: recognizing the power mode; creating touch driving signals that have different amplitudes depending on the detected power mode; and sequentially applying the touch driving signals to a plurality of touch electrodes embedded in a display panel.

According to the present embodiments described above, the touch drive, which is differentiated according to the power mode, may be provided in order to thereby improve the touch sensitivity.

In addition, according to the present embodiments, when the power mode corresponds to the battery mode, the degradation of the touch sensitivity may be prevented.

Furthermore, according to the present embodiments, when the power mode is changed, the touch sensitivity may be improved through an adaptive touch drive.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
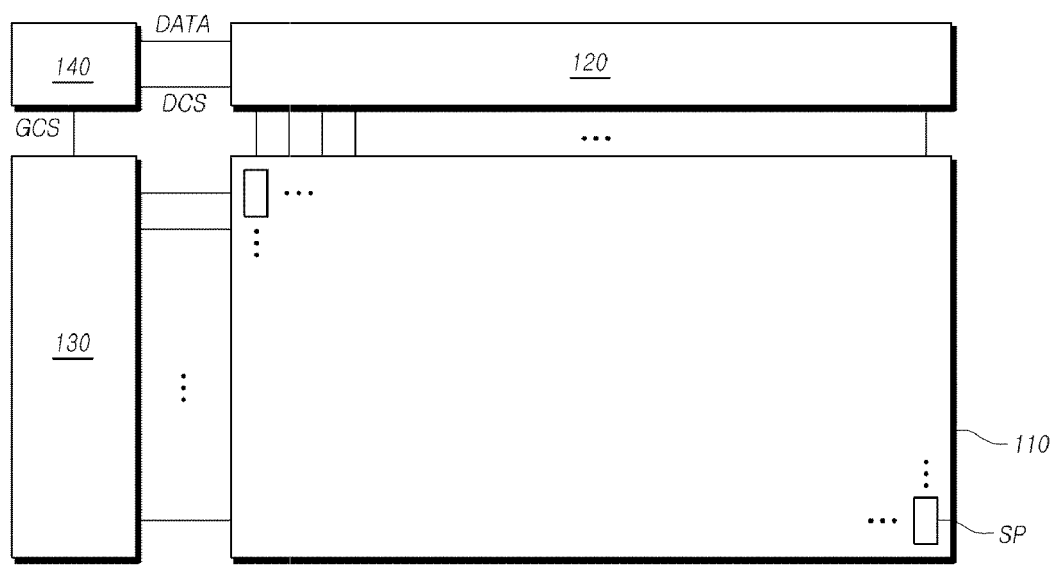
FIG. 1 illustrates the overall system configuration of a display device, according to the present embodiments.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 illustrates the overall system configuration of a display device 100, according to the present embodiments.

The display device 100, according to the present embodiments, may provide a display function for displaying images and a touch sensing function for sensing a user's touch in order to process inputs.

Referring to FIG. 1, in order to provide the display function, the display device, according to the present embodiments, includes: a display panel 110 on which a plurality of data lines (DL) and a plurality of gate lines (GL) are arranged and a plurality of sub-pixels (SP) are arranged; a data driver 120 that drives the plurality of data lines (DL); a gate driver 130 that drives the plurality of gate lines (GL); and a controller 140 that controls the data driver 120 and the gate driver 130.

The controller 140 supplies various control signals to the data driver 120 and the gate driver 130 in order to thereby control the data driver 120 and the gate driver 130.

The controller 140 starts a scan according to the timing implemented in each frame, converts input image data, which is received from the outside, to conform to the data signal format used in the data driver 120 to then output the converted image data, and controls the data driver 120 at an appropriate time according to the scanning.

The controller 140 may be a timing controller that is employed in the existing display technology, or may be a control device that includes the timing controller and further performs other control functions.

The controller 140 may be implemented to be integrated with the data driver 120.

The data driver 120 supplies a data voltage to the plurality of data lines (DL) in order to thereby drive the plurality of data lines (DL). Here, the data driver 120 may be referred to as "source driver" as well.

The gate driver 130 sequentially supplies scan signals to the plurality of gate lines (GL) in order to thereby drive the plurality of gate lines (GL) in sequence. Here, the gate driver 130 may also be referred to as "scan driver".

The gate driver 130 sequentially supplies the scan signals of an on-voltage or an off-voltage to the plurality of gate lines (GL) under the control of the controller 140.

When a specific gate line is opened by the gate driver 130, the data driver 120 converts the image data received from the controller 140 into a data voltage in the analog form, and then supplies the same to the plurality of data lines (DL).

Although the data driver 120 is positioned on only one side (for example, the upper side or lower side) of the display panel 110 in FIG. 1, the data driver 120 may be positioned on both sides (for example, the upper and lower sides) of the display panel 110 according to a driving method, a panel design, or the like.

Although the gate driver 130 is positioned on only one side (for example, the left side or right side) of the display panel 110 in FIG. 1, the gate driver 130 may be positioned on both sides (for example, the left and right sides) of the display panel 110 according to a driving method, a panel design, or the like.

The aforementioned controller 140 receives, from the outside (for example, a host system), various timing signals including a vertical synchronization signal (Vsync), a horizontal synchronization signal (Hsync), an input data enable (DE) signal, a clock signal (CLK), or the like, as well as the input image data.

In addition to the operation of converting the input image data received from the outside to conform to the data signal format used in the data driver 120 and outputting the converted image data in order to control the data driver 120 and the gate driver 130, the controller 140 receives the timing signals {such as the vertical synchronization signal (Vsync), the horizontal synchronization signal (Hsync), the input DE signal, or the clock signal} and creates various control signals to then be output to the data driver 120 and the gate driver 130.

The data driver 120 may include one or more source driver integrated circuits (SDICs), and may drive the plurality of data lines.

Each source driver integrated circuit (SDIC) may be connected to a bonding pad of the display device 110 in a tape automated bonding (TAB) type or a chip on glass (COG) type, or may be directly disposed on the display panel 110, and in some cases, it may be disposed on the display panel 110 by being integrated. In addition, each source driver integrated circuit (SDIC) may be implemented in a chip on film (COF) type in which it is mounted on a film that is connected to the display panel 110.

Each source driver integrated circuit (SDIC) may include a shift register, a latch circuit, a digital-to-analog converter (DAC), an output buffer, and the like.

The gate driver 130 may include one or more gate driver integrated circuits (GDICs).

Each gate driver integrated circuit (GDIC) may be connected to a bonding pad of the display device 110 in a tape automated bonding (TAB) type or a chip on glass (COG) type, or may be directly disposed on the display panel 110 by being implemented in a gate in panel (GIP) type, and in some cases, it may be disposed on the display panel 110 by being integrated. In addition, each gate driver integrated circuit (GDIC) may be implemented in a chip on film (COF) type in which it is mounted on a film that is connected to the display panel 110.

Each gate driver integrated circuit (GDIC) may include a shift register, a level shifter, and the like.

The display device 100, according to the present embodiments, may include one or more source printed circuit boards (S-PCBs) that are necessary for the circuit connection with respect to one or more source driver integrated circuits (SDICs) and a control printed circuit board (C-PCB) for mounting control components and various electrical devices.

A film, on which the source driver integrated circuit (SDIC) is mounted, may be connected between one or more source printed circuit boards (S-PCBs) and the display panel 110.

The controller 140, which controls the operation of the data driver 120 and the gate driver 130, and a power controller, which supplies various voltages or currents to the display panel 110, the data driver 120, and the gate driver 130, or controls the various voltages or currents to be supplied, may be mounted on the control printed circuit board (C-PCB).

One or more source printed circuit boards (S-PCB) and the control printed circuit board (C-PCB) may be connected with each other through a connection medium, such as a flexible printed circuit (FPC) or a flexible flat cable (FFC).

One or more source printed circuit boards (S-PCB) and the control printed circuit board (C-PCB) may be implemented to be integrated in a single printed circuit board.

The display device 100, according to the present embodiments, may be various types of devices, such as a liquid crystal display device, an organic light emitting display device, a plasma display device, or the like.

In addition, the display device 100, according to the present embodiment, for example, may be a mobile device, such as laptop computers, tablets, or smart phones. Furthermore, any device may be adopted, which has the display panel 110 and two or more power sources as the power supply means.

Figure 2:
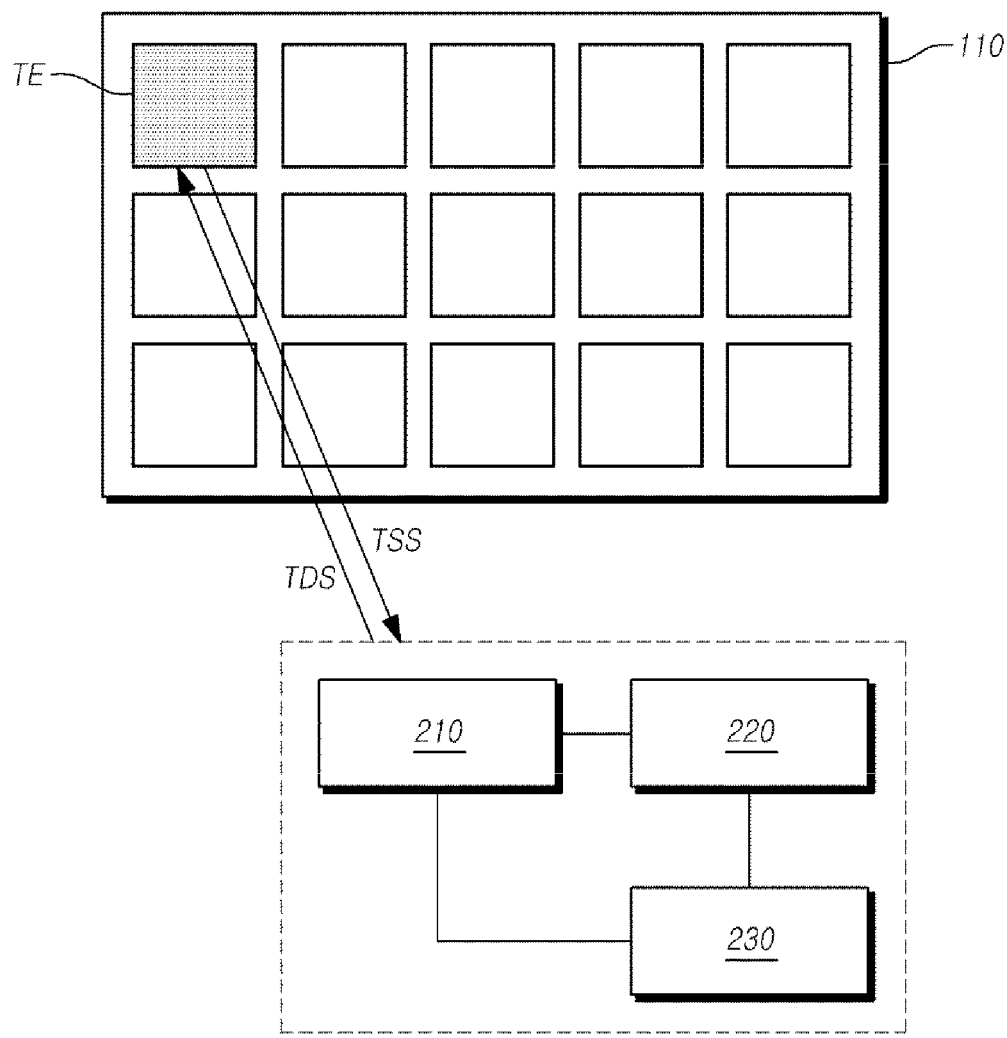
FIG. 2 and FIG. 3 illustrate the configuration of a touch system of a display device, according to the present embodiments.
Figure 3:
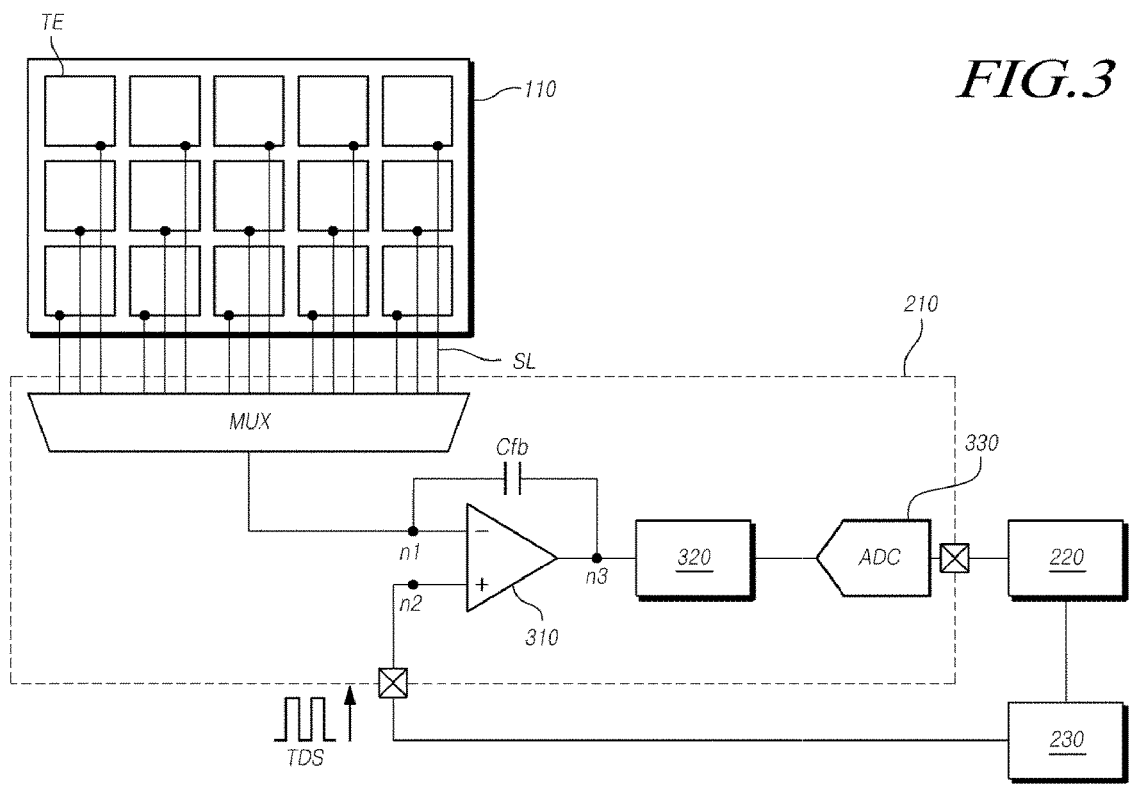

FIG. 2 and FIG. 3 illustrate the configuration of a touch system 200 of the display device 100, according to the present embodiments.

Referring to FIG. 2, the display device 100, according to the present embodiments, includes the touch system 200 to provide a touch sensing function.

Referring to FIG. 2, the touch system 200 may include at least one of: a plurality of touch electrodes (TE); a touch circuit 210; a micro-control unit 220; or a touch power IC (TPIC) 230. This touch system 220 may be referred to as a touch sensing circuit or a touch driving circuit as well.

The plurality of touch electrodes (TE) serve as a touch sensor.

The touch power integrated circuit 230 creates touch driving signals (TDS) at an output port of the touch power integrated circuit 230. The touch driving signals (TDS) are for driving the plurality of touch electrodes (TE) to then be supplied to the touch circuit 210.

Here, the touch driving signal (TDS) may be a pulse width modulation signal in which a high level voltage and a low level voltage alternate with each other according to a predetermined duty cycle. Accordingly, the touch driving signal (TDS) may have a controlled phase and amplitude.

The touch circuit 210 has an input port that is coupled to an output port of the touch power IC 230. The touch circuit 210 receives the touch driving signal TDS from the output port of the touch power IC 230 and sequentially applies the touch driving signals (TDS) supplied from the touch power integrated circuit 230 to the plurality of touch electrodes (TE) in order to thereby drive the plurality of touch electrodes (TE) in sequence.

In addition, the touch circuit 210 receives a touch sensing signal (TSS) from the touch electrode (TE), to which the touch driving signal (TDS) has been applied, and supplies the micro-control unit 220a with a sensed touch value (sensed touch data) corresponding to a digital value based on the received touch sensing signal (TSS).

The micro-control unit 220 may detect whether or not the touch has been made based on the sensed touch value received from the touch circuit 210, and may calculate the coordinates of the touch.

Referring to FIG. 3, the plurality of touch electrodes (TE) may be disposed to be embedded in the display panel 110. Thus, the display device 100, according to the present embodiments, may have the embedded type of touch structure, such as an in-cell type or an on-cell type.

The plurality of touch electrodes (TE) disposed on the display panel 110 may be electrodes that are dedicated to a touch mode for the touch sensing.

Alternatively, the plurality of touch electrodes (TE) disposed on the display panel 110 may be mode common electrodes to which a voltage necessary for the display drive is applied in a display mode and the touch driving signal (TDS) is applied in a touch mode.

For example, the plurality of touch electrodes (TE) disposed on the display panel 110 may be common electrodes to which a common voltage (Vcom) corresponding to a pixel voltage of each sub-pixel is applied in the display mode.

Referring to FIG. 3, each of the plurality of touch electrodes (TE) disposed on the display panel 110 may be connected with a signal line (SL).

The touch circuit 210 may output the touch driving signal (TDS) to one of a plurality of signal lines (SL) in order to thereby drive one of the plurality of touch electrodes (TE).

Referring to FIG. 3, the touch circuit 210 may include an amplifier 310, an integrator circuit 320, an analog-to-digital converter 330, a feedback capacitor (Cfb), and a multiplexer (MUX).

The amplifier 310 is comprised of: the first terminal (n1) that is electrically connected with the touch electrode (TE); the second terminal (n2) to which the touch driving signal (TDS) is applied; and an output terminal (n3) that outputs the touch sensing signal (TSS).

The feedback capacitor (Cfb) is connected between the first terminal (n1) and the output terminal (n3) of the amplifier 310.

The feedback capacitor (Cfb) may be a fixed capacitor that has a fixed capacitance, or may be a variable capacitor that has a variable capacitance.

In addition, the feedback capacitor (Cfb) may be comprised of a plurality of capacitors. In the case where feedback capacitor (Cfb) is the variable capacitor, it may be comprised of a plurality of capacitors and a plurality of switches.

The integrator circuit 320 outputs an integral value of the output voltage of the amplifier 310 {that is, the touch sensing signal that is output from the output terminal (n3) of the amplifier 310}. Such an integrator circuit 320 may be comprised of devices, such as comparators or capacitors.

The analog-to-digital converter (ADC) 330 converts the output voltage (the integral value) of the integrator circuit 320 into a digital value, and outputs the same as a sensed touch value.

The multiplexer (MUX) may output the touch driving signal (TDS) to the signal lines (SL) that are connected with the touch electrodes (TE) to be driven among the plurality of sensing lines (SL).

Meanwhile, the touch sensing circuit for the touch sensing may include, in the form of an integrated circuit, at least one of: the touch circuit 210; the micro-control unit 220; or the touch power integrated circuit 230.

In this regard, the touch circuit 210, the micro-control unit 220, and the touch power integrated circuit 230 may be implemented as separate integrated circuits, respectively.

In some cases, the touch sensing circuit may be an integrated circuit that includes the touch circuit 210 and the micro-control unit 220.

Alternatively, the touch sensing circuit may be an integrated circuit that includes the touch circuit 210, the micro-control unit 220, and the touch power integrated circuit 230.

Figure 4:
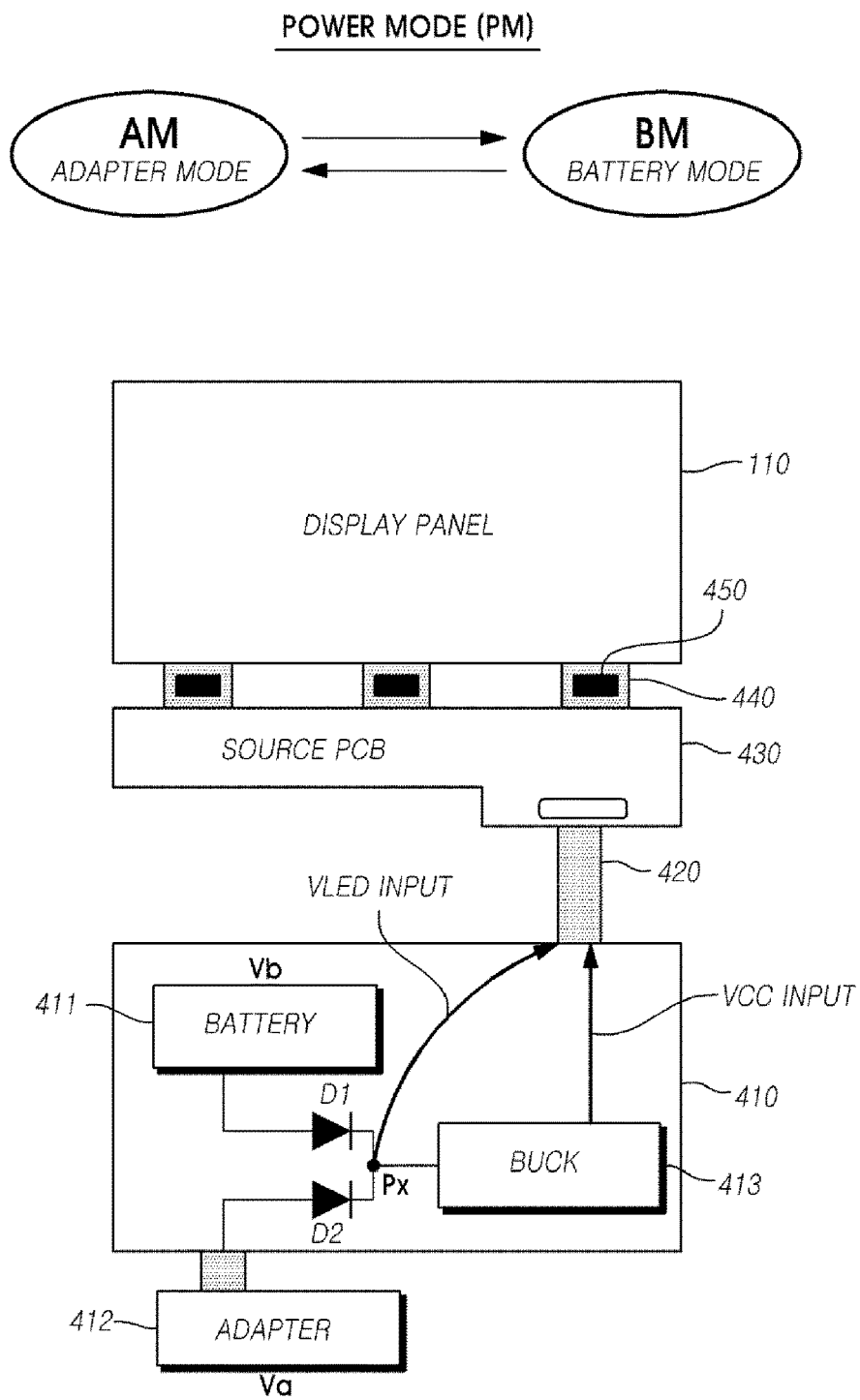
FIG. 4 illustrates the power mode and a power system of a display device, according to the present embodiments.

FIG. 4 illustrates the power mode (PM) and a power system 410 of the display device 100, according to the present embodiments. In the following description, it is assumed that the display device 100, according to the present embodiments, is a liquid crystal display device that includes a backlight unit (BLU).

Referring to FIG. 4, the display device 100, according to the present embodiments, adopts a battery 411 and an power adapter 412 in order to thereby operate by using a power voltage (Va) supplied through the adapter 412, or by using a power voltage (Vb) supplied from the battery 411. For example, the adapter 412 can be an AC-DC adapter that converts an AC voltage into a DC power voltage (Va).

Thus, the power mode (PM) of the display device 100, according to the present embodiments, has an adapter mode (AM) for using the power voltage (Va) supplied through the adapter 412 and a battery mode (BM) for using the power voltage (Vb) supplied from the battery 411.

Referring to FIG. 4, the display device 100, according to the present embodiments, includes a power system 410 that manages the power mode (PM) and supplies the power necessary for the operations of various elements in the display device 100.

The power system 410 of the display device 100, according to the present embodiments, may include: a battery 411 as a power source; an adapter 412 as power supply means; the first diode (D1) that allows the power voltage (Vb) supplied from the battery 411 to be fed only in the forward direction; the second diode (D2) that allows the power voltage (Va) supplied from the adapter 412 to be fed only in the forward direction; and a buck circuit 413 that receives the voltage (Va or Vb) at the point Px where the output terminals of the first diode (D1) and the second diode (D2) are connected with each other and converts the same into the VCC input voltage (for example, 3.3V) necessary for driving the display panel 110 to then output the same.

Although the power voltage (Vb) may be supplied from the battery 411, when the power voltage (Va) is input through the adapter 412, the above-mentioned buck circuit 413 converts the power voltage (Va) supplied through the adapter 412 into the VCC input voltage (for example, 3.3V) necessary for driving the display panel 110 to then output the same.

In addition, when the power voltage (Va) is not supplied through the adapter 412, the buck circuit 413 converts the power voltage (Vb) supplied from the battery 411 into the VCC input voltage (for example, 3.3V) necessary for driving the display panel 110 to then output the same.

The VCC input voltage output from the buck circuit 413 is supplied to the source printed circuit board 430 through a flexible flat cable 420.

In addition, for example, the source driver integrated circuit 450, which is implemented in the chip on film (COF) type, is mounted on a film 440, and the ends of the film 440 having the source driver integrated circuit 450 mounted thereon are bonded to the printed circuit board 430 and the display panel 110, respectively.

Thus, the VCC input voltage output from the buck circuit 413 may be supplied to the film 440 and the source driver integrated circuit 450 mounted thereon through the flexible flat cable 420 and the source printed circuit board 430.

As described above, the voltage at the node Px may correspond to the power voltage (Va) supplied through the adapter 412 or the power voltage (Vb) supplied from the battery 411 according to whether or not the power is supplied through the adapter 412.

The voltage (Va or Vb) at the node Px is used as a voltage for the input power of a backlight driver (not shown), which is applied to the backlight driver.

Accordingly, it may be determined whether the power mode (PM) corresponds to the battery mode (BM) or the adapter mode (AM) by identifying the input power voltage value of the backlight driver.

Meanwhile, the power voltage (Va) supplied through the adapter 412 may not be the same as the power voltage (Vb) supplied from the battery 411.

In general, the power voltage (Vb) supplied from the battery 411 is lower than the power voltage (Va) supplied through the adapter 412. For example, the power voltage (Vb) supplied from the battery 411 may be 12V, and the power voltage (Va) supplied through the adapter 412 may be 19V.

Due to the discrepancy between the power voltage (Va) supplied through the adapter 412 and the power voltage (Vb) supplied from the battery 411, the touch driving performance in the battery mode (BM) may be different from the touch driving performance in the adapter mode (AM), and the touch sensitivity in the battery mode (BM) may be different from the touch sensitivity in the adapter mode (AM).

Meanwhile, in particular, when the power mode (PM) corresponds to the battery mode (BM), deviations of the touch driving performance and the touch sensitivity may occur between the case where the touch occurs and the case where the touch does not occur.

The phenomenon, in which the touch sensitivity deviation occurs depending on the power mode (PM) {in particular, the degradation of the touch sensitivity in the battery mode (BM)}, and the phenomenon, in which the touch sensitivity deviation occurs depending on whether or not the touch is made {in particular, the degradation of the touch sensitivity in the battery mode (BM) upon the occurrence of the touch}, will be described with reference to FIG. 5 and FIG. 6.

Figure 5:
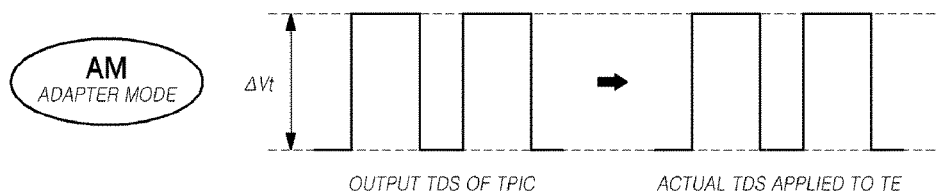
FIG. 5 illustrates a touch driving signal that is output from a touch power integrated circuit and an actual touch driving signal that is applied to a touch electrode when the power mode corresponds to an adapter mode and a battery mode, respectively, in the display device, according to the present embodiments.
Figure 5:
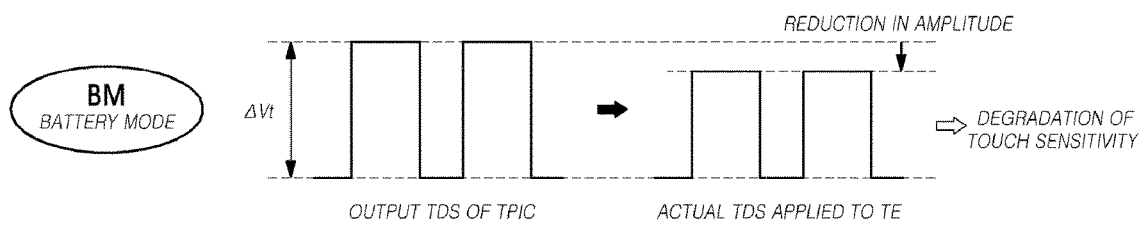

FIG. 5 illustrates the touch driving signal (TDS) that is output from the touch power integrated circuit (TPIC) 230 and the actual touch driving signal (TDS) that is applied to the touch electrode (TE) when the power mode (PM) corresponds to the adapter mode (AM) and the battery mode (BM), respectively, in the display device 100, according to the present embodiments.

FIG. 5 is a view to explain the phenomenon in which the touch sensitivity deviation depending on the power mode (PM) {in particular, the degradation of the touch sensitivity in the battery mode (BM)} occurs.

Referring to FIG. 5, regardless of the type of power mode (PM), the touch power integrated circuit 230 may supply the touch driving signals (TDS), which have the same amplitude (ΔV) at the output port of the touch power integrated circuit 230, to the touch circuit 210.

Referring to FIG. 5, although the touch power integrated circuit 230 outputs the touch driving signals (TDS) that have the same amplitude (ΔV) in the adapter mode (AM) and in the battery mode (BM), the amplitudes of the actual touch driving signals (TDS), which are applied to the touch electrodes (TE) of the display panel 110 through the touch circuit 210, may be different from each other.

In the adapter mode (AM), the amplitude of the actual touch driving signal (TDS) applied to the touch electrode (TE) is almost the same as, or a little bit lower than, the amplitude (ΔV) of the touch driving signal (TDS) that is output from the touch power integrated circuit 230.

On the contrary, in the battery mode (BM), the amplitude of the actual touch driving signal (TDS) applied to the touch electrode (TE) may become low enough to give influence to the touch sensitivity, compared with the amplitude (ΔV) of the touch driving signal (TDS) that is output from the touch power integrated circuit 230.

Therefore, such reduction in the amplitude of the touch driving signal (TDS) in the battery mode (BM) causes the touch sensitivity to deteriorate in the battery mode (BM).

Figure 6:
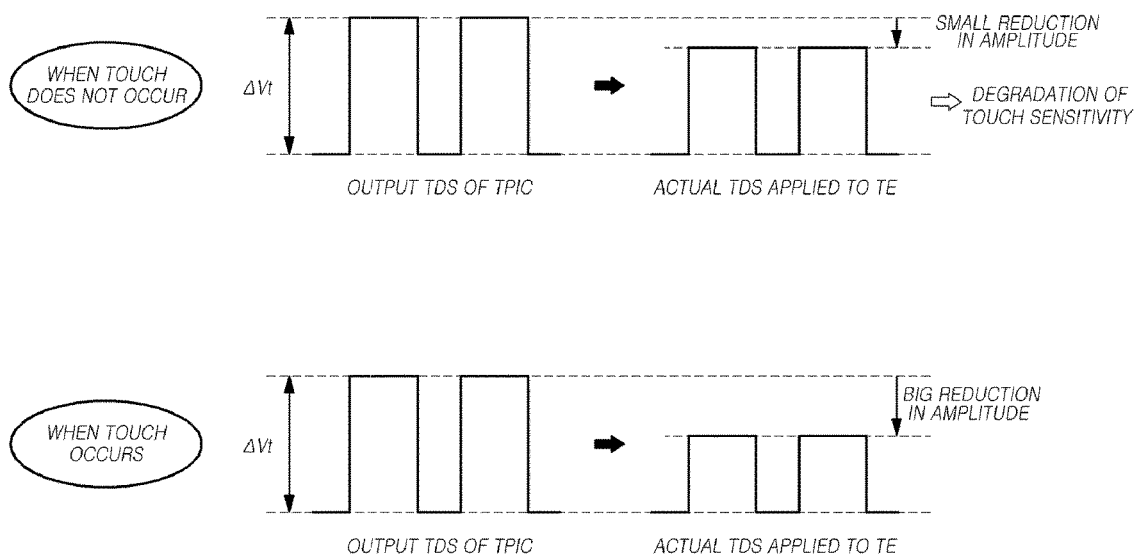
FIG. 6 illustrates a touch driving signal that is output from a touch power integrated circuit and an actual touch driving signal that is applied to a touch electrode in cases where a touch occurs and a touch does not occur, respectively, when the power mode corresponds to a battery mode in the display device, according to the present embodiments.

FIG. 6 illustrates the touch driving signal (TDS) that is output from the touch power integrated circuit 230 and the actual touch driving signal (TDS) that is applied to the touch electrode (TE) in cases where a touch occurs and a touch does not occur, respectively, when the power mode (PM)

corresponds to the battery mode (BM) in the display device 100, according to the present embodiments.

FIG. 6 is a view to explain the phenomenon in which the touch sensitivity deviation depending on the occurrence of the touch {in particular, the degradation of the touch sensitivity upon the occurrence of the touch in the battery mode (BM)} occurs.

Referring to FIG. 6, regardless of the occurrence of the touch, the touch power integrated circuit 230 supplies the touch driving signals (TDS), which have the same amplitude (ΔV), to the touch circuit 210.

Referring to FIG. 6, although the touch power integrated circuit 230 outputs the touch driving signals (TDS) that have the same amplitude (ΔV) when the touch occurs and when the touch does not occur, the amplitudes of the actual touch driving signals (TDS) applied to the touch electrodes (TE) of the display panel 110 through the touch circuit 210 may be different from each other.

The amount of reduction in the amplitude of the actual touch driving signal (TDS) applied to the touch electrode (TE) when the touch occurs, with respect to the amplitude (ΔV) of the touch driving signal (TDS) that is output from the touch power integrated circuit 230, is big enough to degrade the touch sensitivity {compared to the amount of reduction in the amplitude of the actual touch driving signal (TDS) applied to the touch electrode (TE), when the touch does not occur, with respect to the amplitude (ΔV) of the touch driving signal (TDS) that is output from the touch power integrated circuit 230}.

As described above, as the amount of reduction in the amplitude upon the occurrence of the touch increases, the touch sensitivity deteriorates. This phenomenon mainly occurs in the battery mode (BM).

Therefore, the present embodiments disclose a touch sensitivity improving method for preventing the degradation of the touch sensitivity in the battery mode (BM) and preventing the degradation of the touch sensitivity upon the occurrence of the touch, and further discloses the display device 100, the touch system 200, the touch circuit 210, the micro-control unit 220, and the touch power integrated circuit (TPIC) 430 for the same.

Hereinafter, the driving method for the touch sensitivity improvement of the display device 100, according to the present embodiments, will be briefly described first, and then, the display device 100, the touch system 200, the touch circuit 210, the micro-control unit 220, and the touch power integrated circuit (TPIC) 430 for providing the driving method for the touch sensitivity improvement will be described.

Figure 7:
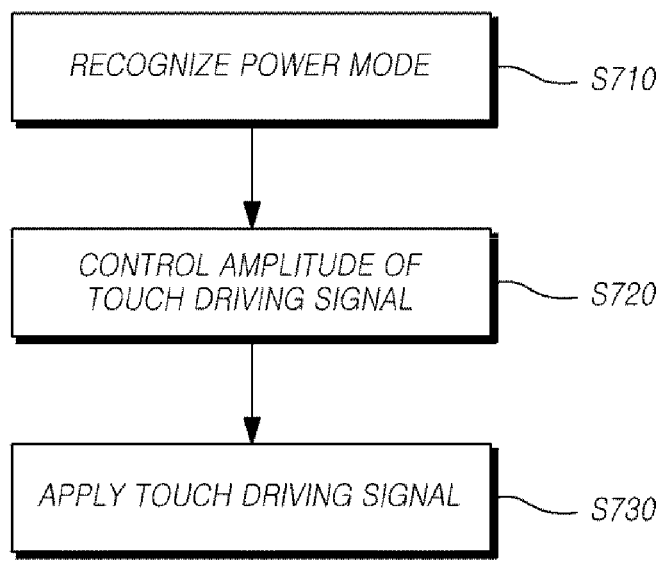
FIG. 7 is a flowchart showing a driving method for improving the touch sensitivity of the display device, according to the present embodiments.

FIG. 7 is a flowchart showing the driving method for improving the touch sensitivity of the display device 100, according to the present embodiments.

Referring to FIG. 7, the display device 100, according to the present embodiments, provides a driving method for improving the touch sensitivity, and the driving method may include: recognizing the power mode (PM) (S710); creating the touch driving signals (TDS) that have different amplitudes at output ports of the touch driving IC according to the detected power mode (PM), which is an operation of controlling the amplitude of the touch driving signal (TDS) (S720); and sequentially applying the touch driving signals (TDS) to a plurality of touch electrodes (TE) embedded in the display panel 110 (S730).

The touch system 200 of the display device 100, which provides the driving method for the touch sensitivity improvement as described above, includes the touch circuit 210 that sequentially outputs the touch driving signals (TDS) for driving the plurality of touch electrodes (TE) embedded in the display panel 110, and the touch power integrated circuit 230 that creates the touch driving signals (TDS), which have different amplitudes according to the power mode (PM), and supplies the same to the touch circuit 210.

According to the description above, the touch driving signals (TDS) having different amplitudes at the output port of the touch power integrated circuit 230 are intentionally created depending on the power mode (PM) and are used for the touch drive, so that the reduction in the amplitude of the touch driving signal (TDS) or the deviation of the reduction amount of the amplitude depending on the power mode (PM) may be prevented, and accordingly, the degradation of the touch sensitivity or the touch sensitivity deviation depending on the power mode (PM) may be prevented in order to thereby improve the touch sensitivity.

As described above, the amplitude of the touch driving signal (TDS) at the output port of the touch power integrated circuit 230 is different according to the power mode (PM).

For example, at the output port of the touch power integrated circuit 230, the amplitude (ΔVbc) of the touch driving signal (TDS) that is created in the battery mode (BM) may be greater than the amplitude (ΔVac) of the touch driving signal (TDS) that is created in the adapter mode (AM). As a result, ΔVbc and ΔVac are different from each other. Amplitude as used herein may refer to the peak to peak amplitude of a signal.

Here, the difference between the amplitude (ΔVbc) of the touch driving signal (TDS) that is created in the battery mode (BM) and the amplitude (ΔVac) of the touch driving signal (TDS) that is created in the adapter mode (AM), by the touch power integrated circuit 230, may be configured according to the difference between the amount of reduction in the amplitude of the touch driving signal (TDS) in the battery mode (BM) and the amount of reduction in the amplitude of the touch driving signal (TDS) in the adapter mode (AM).

Since the amount of reduction in the amplitude in the battery mode (BM) is greater, the amplitude of the actual touch driving signal (TDS) applied to the touch electrode (TE) in both the battery mode (BM) and the adapter mode (AM) may be the same ΔVt by configuring the amplitude (ΔVbc) of the touch driving signal (TDS) that is created in the battery mode (BM) to be greater than the amplitude (ΔVac) of the touch driving signal (TDS) that is created in the adapter mode (AM).

Meanwhile, since there is little or no reduction in the amplitude of the touch driving signal (TDS) when the power mode (PM) corresponds to the adapter mode (AM), the amplitude (ΔVac) of the touch driving signal (TDS) that is created in the adapter mode (AM) may be considered to be almost the same as the amplitude (ΔVt) of the actual touch driving signal (TDS) that is applied to the touch electrode (TE).

Hereinafter, the amplitude (ΔVt) of the actual touch driving signal (TDS) applied to the touch electrode (TE) will be expressed as ΔVt, which may be the targeted amplitude in the case where the touch driving signal (TDS) is created in the adapter mode (AM) and the battery mode (BM), respectively, and may be almost the same as the amplitude (ΔVac) of the touch driving signal (TDS) that is created in the adapter mode (AM).

As described above, the difference between the amplitude of the actual touch driving signal (TDS) applied to the touch electrode (TE) in the adapter mode (AM) and the amplitude of the actual touch driving signal (TDS) applied to the touch electrode (TE) in the battery mode (BM), may be reduced by generating the touch driving signal (TDS) that has the greater amplitude (ΔVbc) in the battery mode (BM) than that in the adapter mode (AM) when the touch power integrated circuit 230 generates the touch driving signals (TDS).

In particular, in order to compensate for the reduction in the amplitude of the touch driving signal (TDS), which is generated in the course of transmitting the touch driving signal (TDS) in the battery mode (BM), the touch driving signal (TDS) is generated through amplitude control so that the touch driving signal (TDS), which does not cause the reduction in the touch sensitivity, may be applied to the touch electrode (TE). According to this, the touch sensitivity may be improved in the battery mode (BM).

Meanwhile, the touch power integrated circuit 230 may create the touch driving signals (TDS) that have different amplitudes depending on the input power voltage (VLED) of the backlight driver.

For example, if the input power voltage (VLED) of the backlight driver corresponds to the power voltage (Va) that is supplied through the adapter 412, the touch power integrated circuit 230 may create the touch driving signal (TDS) that has an amplitude (ΔVac) corresponding to the adapter mode (AM), and if the input power voltage (VLED) of the backlight driver corresponds to the power voltage (Vb) that is supplied from the battery 411, the touch power integrated circuit 230 may create the touch driving signal (TDS) that has an amplitude (ΔVbc) corresponding to the battery mode (BM).

As described with reference to FIG. 4 above, when the input power voltage (VLED) of the backlight driver is identified, the power mode (PM) may be detected to be either the battery mode (BM) or the adapter mode (AM). Therefore, the touch power integrated circuit 230 may perform the amplitude control of the touch driving signal (TDS) based on the input power voltage (VLED) of the backlight driver.

Meanwhile, when the power mode (PM) is changed (AM→BM, BM→AM), the touch power integrated circuit 230 may perform the amplitude control in which the amplitude of the touch driving signal (TDS) is changed step by step, and may supply the touch circuit 210 with the touch driving signal (TDS) having the amplitude that has been controlled step by step.

More specifically, when the power mode (PM) switches from the adapter mode (AM) to the battery mode (BM), the touch power integrated circuit 230 increases the amplitude (ΔVac) of the touch driving signal (TDS) in the adapter mode (AM) to the amplitude (ΔVbc) corresponding to the battery mode (BM) step by step through one or more intermediate increased amplitudes (ΔVi), and supplies the touch driving signal (TDS) having the controlled amplitude (ΔV) to the touch circuit 210 in each step.

When the power mode (PM) switches from the battery mode (BM) to the adapter mode (AM), the touch power integrated circuit 230 reduces the amplitude (ΔVbc) of the touch driving signal (TDS) in the battery mode (BM) to the amplitude (ΔVac) corresponding to the adapter mode (AM) step by step through one or more intermediate reduced amplitudes (ΔVd), and supplies the touch driving signal (TDS) having the controlled amplitude (ΔV) to the touch circuit 210 in each step.

As described above, when the power mode is changed, the sensing instability due to a sudden fluctuation of the amplitude of the touch driving signal (TDS) may be attenuated through the phased change in the amplitude.

For the amplitude control mentioned above, the micro-control unit 220 may detect the power mode (PM), and may output an amplitude control signal (ACS) to the touch power integrated circuit 230.

Accordingly, the touch power integrated circuit 230 controls the amplitude (ΔV) based on the amplitude control signal (ACS) received from the micro-control unit 220, and creates the touch driving signal (TDS) having the controlled amplitude (ΔV) to then be supplied to the touch circuit 210.

As described above, the micro-control unit 220 may provide the touch power integrated circuit 230 with the amplitude control signal for controlling the amplitude of the touch driving signal (TDS) so that the touch power integrated circuit 230 can accurately and efficiently control the amplitude of the touch driving signal (TDS).

Hereinafter, the power mode recognition method and the amplitude control method for improving the touch sensitivity will be described in more detail, respectively.

Figure 8:
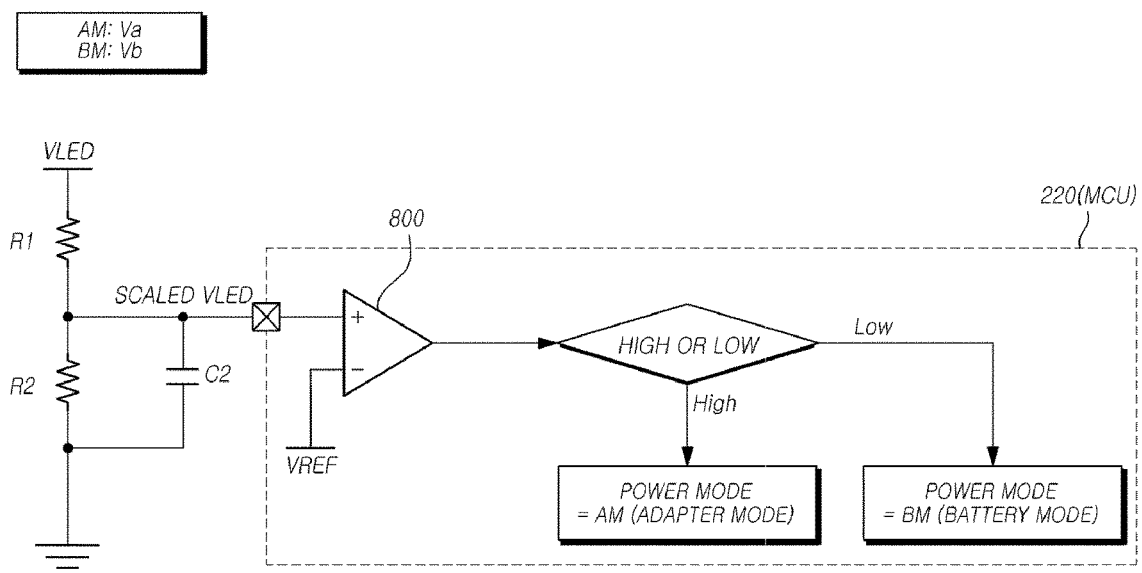
FIG. 8 is a view to explain the first power mode recognition method of a micro-control unit in the display device, according to the present embodiments.

FIG. 8 is a view to explain the first power mode recognition method of the micro-control unit 220 in the display device 100, according to the present embodiments.

Referring to FIG. 8, the micro-control unit 220 may detect whether the power mode (PM) is the adapter mode (AM) or the battery mode (BM) based on the input power voltage (VLED) of the backlight driver.

As described above, the power mode (PM) may be easily and accurately detected by using the input power of the backlight driver.

To this end, the micro-control unit 220 may include a comparator 800 that receives the input power voltage (VLED) of the backlight driver and a reference voltage (VREF) and outputs a comparison result signal, and may detect the power mode (PM) to be one of the adapter mode (AM) or the battery mode (BM) based on the comparison result signal (High or Low) of the comparator 800.

As described above, the comparator 800 may receive the input power voltage (VLED) of the backlight driver and the reference voltage (VREF), and may compare the input power voltage (VLED) of the backlight driver with the reference voltage (VREF) in order to thereby output the comparison result signal.

Alternatively, the comparator 800 may receive a voltage (Scaled VLED), which is obtained by scaling the input power voltage (VLED) of the backlight driver by using a voltage dividing circuit, and the reference voltage (VREF), and may compare the scaled input power voltage (Scaled VIED) of the backlight driver with the reference voltage (VREF) in order to thereby output the comparison result signal.

Here, the voltage dividing circuit may include two or more resistors (R1 and R2), and in some cases, the voltage dividing circuit may further include one or more capacitors (C2).

The voltage dividing circuit shown in FIG. 8 is configured by the first resistor (R1) and the second resistor (R2), which are connected with each other in series between the input power voltage (VLED) of the backlight driver and the ground voltage, wherein the connection point between the first resistor (R1) and the second resistor (R2) is connected to the positive input terminal of the comparator 800.

The connection point between the first resistor (R1) and the second resistor (R2) has the scaled input power voltage (Scaled VIED) of the backlight driver.

The input power voltage (VLED) of the backlight driver corresponds to the power voltage (Va) supplied through the adapter 412 in the adapter mode (AM), and the input power voltage (VLED) of the backlight driver corresponds to the power voltage (Vb) supplied from the battery 411 in the battery mode (BM).

Since the power voltage (Vb) supplied from the battery 411 is lower than the power voltage (Va) supplied through the adapter 412, the voltage to be applied to the positive input terminal of the comparator 800 becomes low in the battery mode (BM), and the voltage to be applied to the positive input terminal of the comparator 800 becomes high in the adapter mode (AM).

The reference voltage may correspond to the voltage between the voltage to be applied to the positive input terminal of the comparator 800 in the battery mode (BM) and the voltage to be applied to the positive input terminal of the comparator 800 in the adapter mode (AM).

If the comparison result signal of the comparator 800 is a high level signal, the micro-control unit 220 detect the power mode (PM) to be the adapter mode (AM).

If the comparison result signal of the comparator 800 is a low level signal, the micro-control unit 220 detect the power mode (PM) to be the battery mode (BM).

Figure 9:
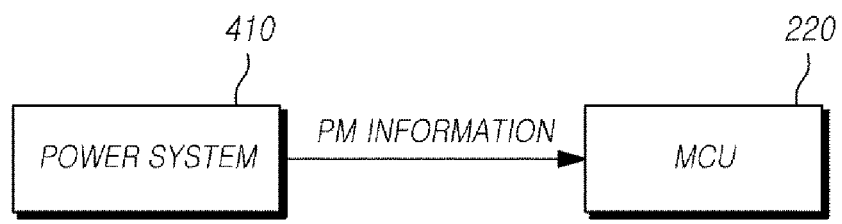
FIG. 9 is a view to explain the second power mode recognition method of a micro-control unit in the display device, according to the present embodiments.

FIG. 9 is a view to explain the second power mode recognition method of the micro-control unit 220 in the display device 100, according to the present embodiments.

Referring to FIG. 9, the micro control unit 220 may receive power mode (PM) information from the power system 410 in order to thereby detect the power mode (PM) to be one of the adapter mode (AM) or the battery mode (BM).

Here, the power system 410 may perform the power mode recognition in the same manner as the power mode recognition method of the micro-control unit 220 described with reference to FIG. 8.

Figure 10:
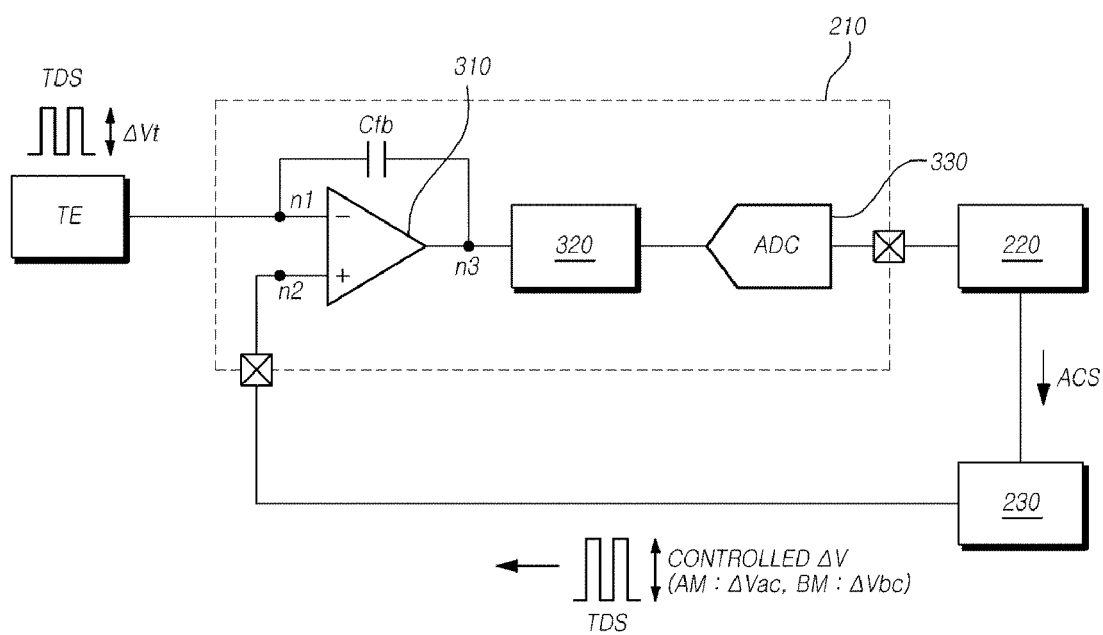
FIG. 10 is a view to explain an amplitude control method of a touch driving signal in the display device, according to the present embodiments.
Figure 11:
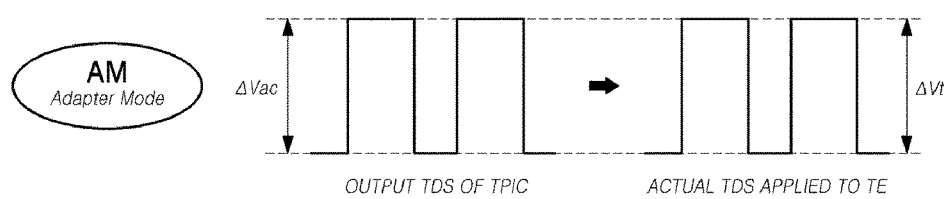
FIG. 11 illustrates a touch driving signal that is output from a touch power integrated circuit and an actual touch driving signal that is applied to a touch electrode according to the amplitude control method of the touch driving signal when the power mode corresponds to an adapter mode and a battery mode, respectively, in the display device, according to the present embodiments.
Figure 11:
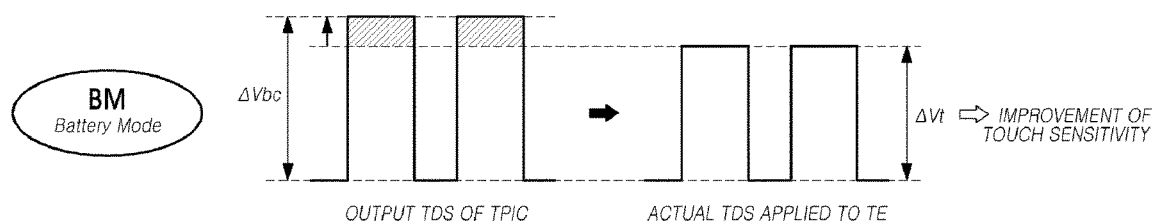

FIG. 10 is a view to explain the amplitude control method of the touch driving signal (TDS) in the display device 100, according to the present embodiments, and FIG. 11 illustrates the touch driving signal (TDS) that is output from the touch power integrated circuit 230 and the actual touch driving signal (TDS) that is applied to the touch electrode (TE) according to the amplitude control method of the touch driving signal (TDS) when the power mode (PM) corresponds to the adapter mode (AM) and the battery mode (BM), respectively, in the display device 100, according to the present embodiments The MCU 220 detects the power mode and then generates an amplitude control signal ACS based on whether the detected power mode is battery mode (BM) or adapter mode (AM).

Referring to FIG. 10, if the power mode (PM) is detected to be the battery mode (BM) as a result of the power mode recognition, the micro-control unit 220 may output an amplitude control signal (ACS) to the touch power integrated circuit 230.

Here, the amplitude control signal, which is output when the power mode (PM) is detected to be the battery mode (BM), may contain at least one piece of the power mode information, which states that the power mode (PM) corresponds to the battery mode (BM), or includes information about an amount of amplitude increase.

Accordingly, the touch power integrated circuit 230 may create the touch driving signal (TDS), which has a predefined amplitude (ΔVbc) in the battery mode (BM), according to the power mode information contained in the amplitude control signal, and may output the same.

Alternatively, the touch power integrated circuit 230 may create the touch driving signal (TDS), which has an amplitude (ΔVbc) that is controlled according to the amplitude-increased amount information contained in the amplitude control signal, and may output the same.

As described above, the micro-control unit 220 may provide the touch power integrated circuit 230 with the amplitude control signal (ACS) for controlling the amplitude of the touch driving signal (TDS) through the power mode recognition so that the touch power integrated circuit 230 may accurately and efficiently control the amplitude of the touch driving signal (TDS) according to the amplitude control signal (ACS).

Meanwhile, if the power mode (PM) is detected to be the adapter mode (AM) as a result of the power mode recognition, the micro-control unit 220 may not output the amplitude control signal (ACS) to the touch power integrated circuit 230.

That is, the micro-control unit 220 may output the amplitude control signal (ACS) to the touch power integrated circuit 230 only when the power mode (PM) is identified to be the battery mode (BM) as a result of the power mode recognition.

Alternatively, due to the power mode change, the micro-control unit 220 needs to create the amplitude control signal (ACS) corresponding to the adapter mode (AM) and needs to output the same to the touch power integrated circuit 230 even when the power mode (PM) is identified to be the adapter mode (AM).

Therefore, with the extension or generalization of the function in consideration of the power mode changing situation, if the power mode (PM) switches from the adapter mode (AM) to the battery mode (BM) as a result of the power mode recognition, the micro-control unit 220 creates and outputs the amplitude control signal (ACS) that contains at least one of the power mode information (power mode change information), which states that the power mode (PM) has switched from the adapter mode (AM) to the battery mode (BM), or the amplitude-increased amount information.

In addition, if the power mode (PM) switches from the battery mode (BM) to the adapter mode (AM) as a result of the power mode recognition, the micro-control unit 220 creates and outputs the amplitude control signal (ACS) that contains at least one of the power mode information (power mode change information), which states that the power mode (PM) has switched from the battery mode (BM) to the adapter mode (AM), or the amplitude-increased amount information.

Meanwhile, the micro-control unit 220 may determine the amplitude-increased amount information or the amplitude-reduced amount information, which may be contained in the amplitude control signal (ACS), based on the result of recognizing the power mode (PM) and a touch sensing signal (TSS) that is received through the touch electrode (TE) to which the touch driving signal (TDS) is applied (i.e. based on a sensed value corresponding to a digital value of the touch sensing signal (TSS)).

This is intended to detect whether or not the amplitude of the actual touch driving signal (TDS) applied to the touch electrode (TE) reaches a desired amplitude (ΔVt) as a result of amplitude control, through the touch sensing signal (TSS), in order to thereby re-adjust the amplitude control signal ACS until the amplitude of the actual touch driving signal (TDS) applied to the touch electrode (TE) reaches the desired amplitude (ΔVt). According to this, it is possible to make an accurate amplitude control so that the touch sensitivity may be further improved.

Referring to FIG. 11, according to the amplitude control above, when the power mode (PM) corresponds to the battery mode (BM), the touch power integrated circuit 230 controls the amplitude (ΔVbc) of the touch driving signal (TDS) at the output port of the touch power integrated circuit 230 to be greater than the amplitude (ΔVt) of the actual touch driving signal (TDS) that is desired to be applied to the touch electrode (TE). This accounts for the reduction in the amplitude. Accordingly, even with the reduction in the amplitude, the actual touch driving signal (TDS) applied to the touch electrode (TE) may have the desired amplitude (ΔVt).

Meanwhile, provided that there is no reduction in the amplitude in the adapter mode (AM), the touch power integrated circuit 230 may create and output the touch driving signal (TDS) that has the same amplitude (ΔVac) as the amplitude (ΔVt) of the actual touch driving signal (TDS) that is desired to be applied to the touch electrode (TE) without the amplitude control.

Provided that there is a slight reduction in the amplitude in the adapter mode (AM), the touch power integrated circuit 230 may create and output the touch driving signal (TDS) having the amplitude (ΔVac) at the output port of the touch power integrated circuit 230 that is greater than the amplitude (ΔVt) of the actual touch driving signal (TDS), which is desired to be applied to the touch electrode (TE), by the amount of reduction in the amplitude.

Hereinafter, two amplitude control methods for the touch driving signal (TDS) in the case of the change in the power mode will be described.

Figure 12:
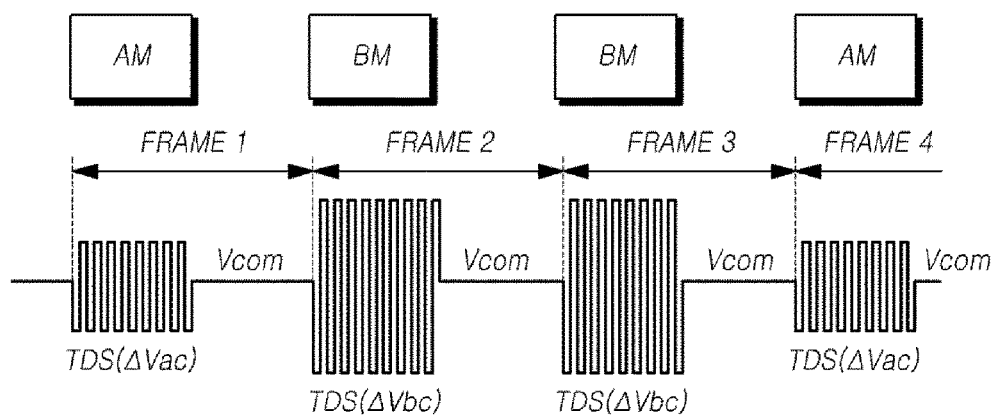
FIG. 12 illustrates a radical amplitude control method of a touch driving signal according to the change in the power mode in the display device, according to the present embodiments.

FIG. 12 illustrates a radical amplitude control method of the touch driving signal (TDS) according to the change in the power mode in the display device 100, according to the present embodiments.

Referring to FIG. 12, a single frame may be divided into a touch mode period and a display mode period.

Provided that the touch electrode (TE) is the mode common electrode, the touch driving signals (TDS) are sequentially applied to the touch electrodes (TE) in the touch mode period, and the common voltage (Vcom) may be applied to all of the touch electrodes (TE) in the display mode period.

Referring to FIG. 12, when the frame 1 switches to the frame 2, the adapter mode (AM) switches to the battery mode (BM).

In the touch mode period of the frame 1 in which the power mode (PM) corresponds to the adapter mode (AM), the amplitude of the touch driving signal (TDS), which is output from the touch power integrated circuit 230, is ΔVac corresponding to the adapter mode (AM).

In addition, in the touch mode period of the frame 2 in which the power mode (PM) switches to the battery mode (BM), the touch power integrated circuit 230 creates and outputs the touch driving signal (TDS) that has an amplitude (ΔVbc) corresponding to the battery mode (BM) through the amplitude control.

Here, the amplitude (ΔVbc) corresponding to the battery mode (BM) is greater than the amplitude (ΔVac) corresponding to the adapter mode (AM).

Referring to FIG. 12, when the frame 3 switches to the frame 4, the battery mode (BM) switches to the adapter mode (AM).

In the touch mode period of the frame 3 in which the power mode (PM) corresponds to the battery mode (BM), the amplitude of the touch driving signal (TDS), which is output from the touch power integrated circuit 230, is ΔVbc corresponding to the battery mode (BM).

In addition, in the touch mode period of the frame 4 in which the power mode (PM) switches to the adapter mode (AM), the touch power integrated circuit 230 creates and outputs the touch driving signal (TDS) that has an amplitude (ΔVac) corresponding to the adapter mode (AM) through the amplitude control.

Here, the amplitude (ΔVac) corresponding to the adapter mode (AM) is smaller than the amplitude (ΔVbc) corresponding to the battery mode (BM).

Referring to FIG. 12, when the power mode is changed, the amplitude (ΔVac) corresponding to the adapter mode (AM) before the change is directly changed to the amplitude (ΔVbc) corresponding to the changed battery mode (BM). In addition, the amplitude (ΔVbc) corresponding to the previous battery mode (BM) is directly changed to the amplitude (ΔVac) corresponding to the changed adapter mode (AM).

According to the description above, the amplitude control method shown in FIG. 12 refers to an fast amplitude control method in which the amplitude corresponding to the previous power mode is directly changed to the amplitude corresponding to the changed power mode when changing the amplitude according to the change in the power mode.

Hereinafter, a phased amplitude control method will be described, in which the amplitude corresponding to the previous power mode is changed to the intermediate amplitude more than once, and then is changed to the final amplitude corresponding to the changed power mode when changing the amplitude according to the change in the power mode. In other words, the amplitude is slowly increased or decreased across several display frames when switching power modes.

Here, the intermediate amplitude corresponds to the amplitude between the amplitude corresponding to the previous power mode and the final amplitude corresponding to the changed power mode.

Figure 13A:
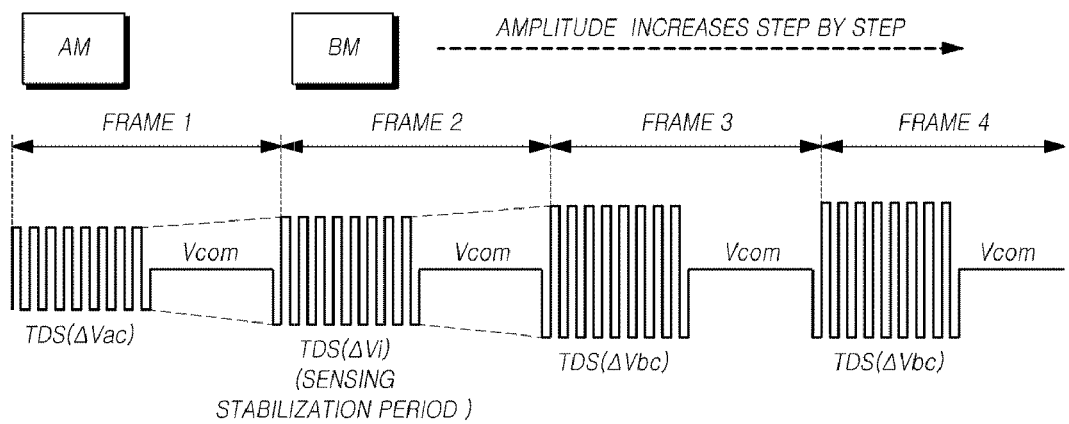
FIG. 13a and FIG. 13b illustrate a phased amplitude control method of a touch driving signal according to the change in the power mode in the display device, according to the present embodiments.
Figure 13B:
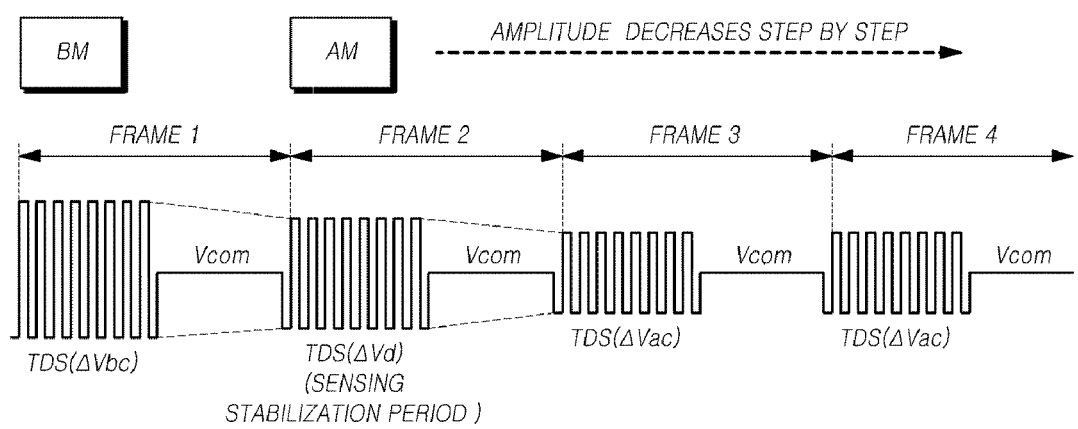

FIG. 13*a* and FIG. 13*b* illustrate a phased amplitude control method of the touch driving signal (TDS) according to the change in the power mode (PM) in the display device 100, according to the present embodiments. Here, it is assumed that there is one intermediate amplitude in FIG. 13*a* and FIG. 13*b*.

Referring to FIG. 13*a*, when the frame 1 switches to the frame 2, the adapter mode (AM) switches to the battery mode (BM) and the frame 3 and the frame 4 remain in the battery mode (BM).

In the touch mode period of the frame 1, in which the power mode (PM) corresponds to the adapter mode (AM), the amplitude of the touch driving signal (TDS), which is output from the touch power integrated circuit 230, is ΔVac corresponding to the adapter mode (AM).

In addition, in the touch mode period of the frame 2, in which the power mode (PM) switches to the battery mode (BM), the touch power integrated circuit 230 initially creates and outputs the touch driving signal (TDS) that has the intermediate amplitude (ΔVi) that is greater than the amplitude (ΔVac) corresponding to the adapter mode (AM), and is less than the amplitude (ΔVbc) corresponding to the battery mode (BM), through the intermediate amplitude control.

In addition, in the touch mode period of the frame 3, in which the power mode (PM) remains the battery mode (BM), the touch power integrated circuit 230 creates and outputs the touch driving signal (TDS) that has the final amplitude (ΔVbc) corresponding to the battery mode (BM) by further increasing the intermediate amplitude (ΔVi) through the intermediate amplitude control.

In the touch mode period of the frame 4, in which the power mode (PM) remains to be the battery mode (BM), the touch power integrated circuit 230 outputs the touch driving signal (TDS) that has the final amplitude (ΔVbc) corresponding to the battery mode (BM).

Here, the touch mode period in the frame 2, in which the touch power integrated circuit 230 creates and outputs the touch driving signal (TDS) having the intermediate amplitude (ΔVi), may be a sensing stabilization period for buffering the abrupt change in the amplitude of the touch driving signal (TDS).

Although the touch driving signal (TDS) is applied to the touch electrode (TE) in the sensing stabilization period, the touch sensing process may not be performed.

Referring to FIG. 13b, when the frame 1 switches to the frame 2, the battery mode (BM) switches to the adapter mode (AM) and the frame 3 and the frame 4 remain in the adapter mode (AM).

In the touch mode period of the frame 1, in which the power mode (PM) corresponds to the battery mode (BM), the amplitude of the touch driving signal (TDS), which is output from the touch power integrated circuit 230, is ΔVbc corresponding to the battery mode (BM).

In addition, in the touch mode period of the frame 2, in which the power mode (PM) switches to the adapter mode (AM), the touch power integrated circuit 230 initially creates and outputs the touch driving signal (TDS) having the intermediate amplitude (ΔVd), which is less than the amplitude (ΔVbc) corresponding to the battery mode (BM), but is greater than the amplitude (ΔVac) corresponding to the adapter mode (AM), through the intermediate amplitude control.

In addition, in the touch mode period of the frame 3, in which the power mode (PM) remains the adapter mode (AM), the touch power integrated circuit 230 creates and outputs the touch driving signal (TDS) that has the final amplitude (ΔVac) corresponding to the adapter mode (AM) by further reducing the intermediate amplitude (ΔVd) through the intermediate amplitude control.

In the touch mode period of the frame 4, in which the power mode (PM) remains the adapter mode (AM), the touch power integrated circuit 230 outputs the touch driving signal (TDS) that has the final amplitude (ΔVac) corresponding to the adapter mode (AM).

Here, the touch mode period in the frame 2, in which the touch power integrated circuit 230 creates and outputs the touch driving signal (TDS) having the intermediate amplitude (ΔVd), may be a sensing stabilization period for buffering the abrupt change in the amplitude of the touch driving signal (TDS).

Although the touch driving signal (TDS) is applied to the touch electrode (TE) in the sensing stabilization period, the touch sensing process may not be performed.

According to the amplitude control method for the touch driving signal (TDS) as described above, the touch driving signal (TDS) having the desired amplitude (ΔVt) can be applied to the touch electrode (TE), and thus, even with the change in the power mode, and even in the battery mode (BM), the touch sensitivity can be significantly improved.

Hereinafter, several touch sensitivity improving methods will be further described in addition to the touch sensitivity improving method through the amplitude control.

Figure 14:
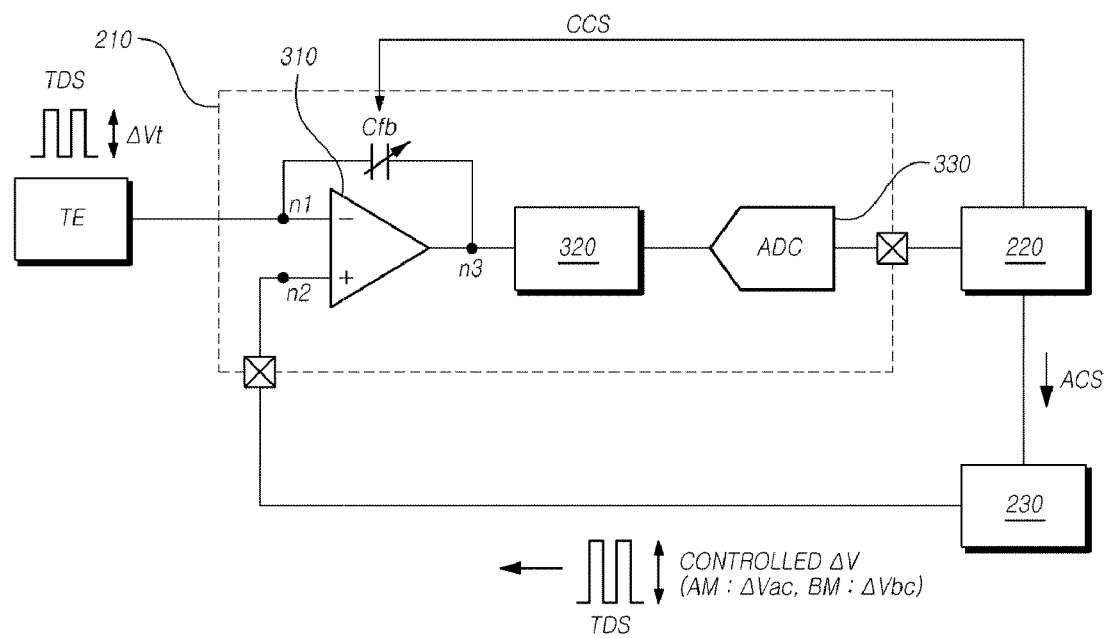
FIG. 14 is a view to explain a feedback capacitor control method for improving the touch sensitivity in the display device, according to the present embodiments.

FIG. 14 is a view to explain the feedback capacitor (Cfb) control method for improving the touch sensitivity in the display device 100, according to the present embodiments.

Referring to FIG. 14, the touch circuit 210 may include the amplifier 310, the integrator circuit 320, the analog-to-digital converter 330, and the feedback capacitor (Cfb) as described above.

The amplifier 310 is comprised of: the first terminal (n1) that is electrically connected to the touch electrode (TE); the second terminal (n2) to which the touch driving signal (TDS) is applied; and the output terminal (n3) for outputting the touch sensing signal (TSS).

The feedback capacitor (Cfb) is connected between the first terminal (n1) and the output terminal (n3) of the amplifier 310.

The feedback capacitor (Cfb) may be, for example, a variable capacitor that has a variable capacitance.

In addition, the feedback capacitor (Cfb) may be comprised of a plurality of capacitors. In the case where the feedback capacitor (Cfb) is the variable capacitor, it may be comprised of a plurality of capacitors and a plurality of switches.

The integrator circuit 320 outputs an integral value of the output voltage of the amplifier 310 {that is, the touch sensing signal that is output from the output terminal (n3) of the amplifier 310}. Such an integrator circuit 320 may be comprised of devices, such as comparators or capacitors.

The analog-to-digital converter (ADC) 330 converts the output voltage (the integral value) of the integrator circuit 320 into a digital value, and outputs the same as a sensed value.

Referring to FIG. 14, the amplitude of the touch driving signal (TDS), which is input to the second terminal (n2) of the amplifier 310 in the touch circuit 210, is the amplitude (ΔV) that is controlled by the touch power integrated circuit 230.

If the power mode (PM) switches from the battery mode (BM) to the adapter mode (AM), the amplitude of the touch driving signal (TDS), which is input to the second terminal (n2) of the amplifier 310, may be the amplitude (ΔVac) corresponding to the adapter mode (AM) or the intermediate amplitude (ΔVd).

If the power mode (PM) switches from the adapter mode (AM) to the battery mode (BM), the amplitude of the touch driving signal (TDS), which is input to the second terminal (n2) of the amplifier 310, may be the amplitude (ΔVbc) corresponding to the battery mode (BM) or the intermediate amplitude (ΔVi).

Referring to FIG. 14, as another method for improving the touch sensitivity, it is possible to control the capacitance of the feedback capacitor (Cfb).

To this end, the micro-control unit 220 may output a capacitance control signal (CCS) for controlling the capacitance of the feedback capacitor (Cfb) in the touch circuit 210 to the touch circuit 210.

For example, the amplitude of the output signal (output voltage) of amplifier 310 may increase by reducing the capacitance of the feedback capacitor (Cfb) in order to thereby obtain a greater sensed value so that the touch sensitivity may be improved.

The degree of reduction in the capacitance of the feedback capacitor (Cfb) may be limited by the output range of the amplifier 310, and may be appropriately configured in consideration of the amount of reduction in the amplitude of the touch driving signal (TDS). For example, the capacitance can be set to a high capacitance level during adapter mode. The capacitance can be set to a low capacitance level during battery mode in order to increase touch sensitivity.

In order to control the capacitance of the feedback capacitor (Cfb), the feedback capacitor (Cfb) may be implemented to be a variable capacitor.

As described above, the control of the capacitance of the feedback capacitor (Cfb) may further improve the touch sensitivity, and may further expect the improvement of the touch sensitivity in the battery mode (BM) in which the reduction in the amplitude of the touch driving signal (TDS) may occur.

Figure 15:
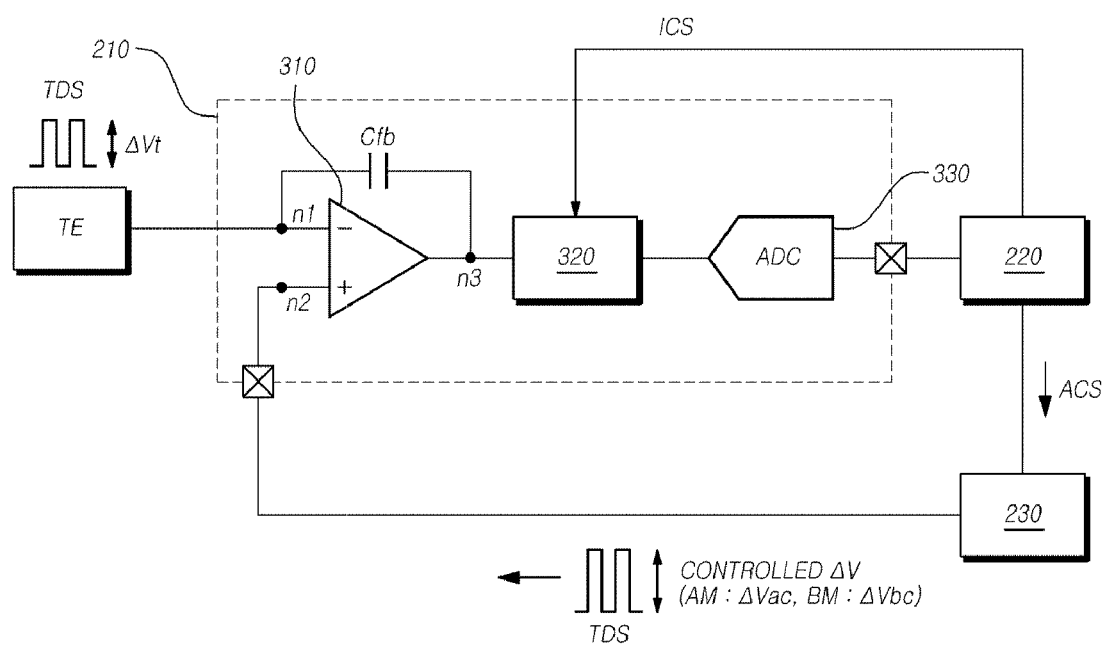
FIG. 15 is a view to explain an integrator circuit control method for improving the touch sensitivity in the display device, according to the present embodiments.

FIG. 15 is a view to explain a method for controlling the integrator circuit 320 in order to improve the touch sensitivity in the display device 100, according to the present embodiments.

Referring to FIG. 15, as another method for improving the touch sensitivity, it is possible to control the number of integration times of the integrator circuit 320 in the touch circuit 210.

To this end, the micro-control unit 220 may output an integrator control signal (ICS) for controlling the number of integration times of the integrator circuit 320 to the touch circuit 210.

Here, the degree of controlling the number of integration times of the integrator circuit 320 may be configured to account for the amount of reduction in the amplitude of the touch driving signal (TDS) in the battery mode (BM). For example, the number of integration times can be set to a low number of integration times during adapter mode. The number of integration times can be set to a high number of integration times during battery mode in order to increase touch sensitivity.

The integrator circuit 320 outputs an integral value of the voltage of the output terminal (n3) of the amplifier 310, and at this time, if the number of integration times increases according to the integrator control signal, the output integral value may increase in order to thereby obtain a greater sensed value. According to this, the touch sensitivity may be further improved.

Such improvement of the touch sensitivity may be more prominent in the battery mode (BM) in which the reduction in the amplitude of the touch driving signal (TDS) may occur.

Figure 16:
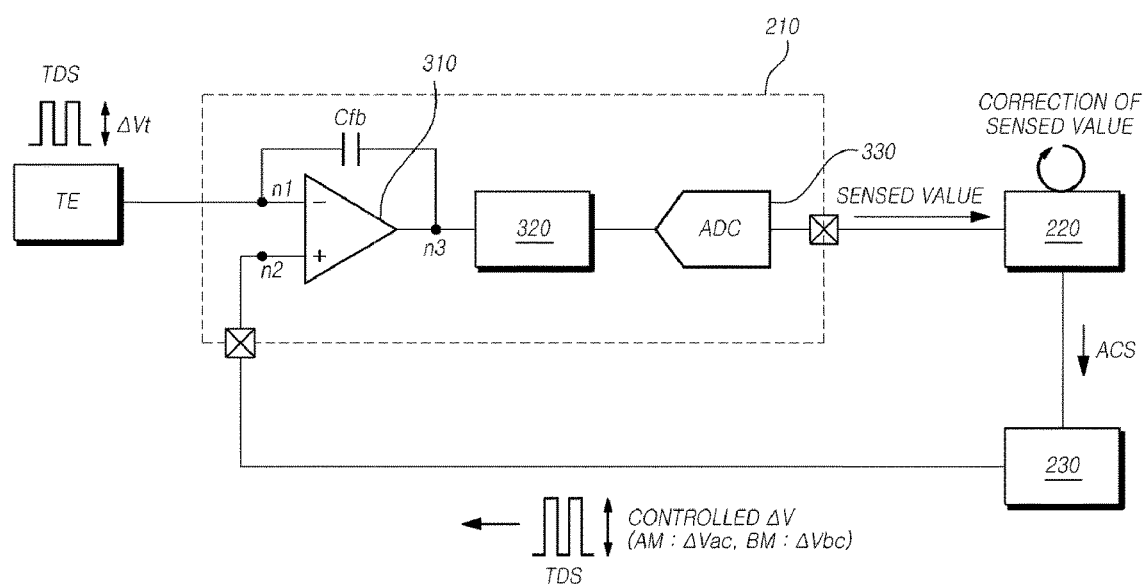
FIG. 16 is a view to explain a method of correcting a sensed value for improving the touch sensitivity in the display device, according to the present embodiments.

FIG. 16 is a view to explain a method of correcting a sensed value for improving the touch sensitivity in the display device 100, according to the present embodiments.

Referring to FIG. 16, the micro-control unit 220 may perform a touch algorithm for recognizing the touch or calculating the touch coordinates by using a corrected sensed value that is obtained by adding a predetermined correction value to a sensed value output from the analog-to-digital converter (ADC) 330 instead of recognizing the touch or calculating the touch coordinates by using the sensed value corresponding to the digital value output from the analog-to-digital converter (ADC) 330 in the touch circuit 210.

Here, the predetermined correction value may be calculated and configured to be a value corresponding to the amount of reduction in the amplitude of the touch driving signal (TDS). For example, the correction value may be set to a low value (e.g. zero) during adapter mode. The correction value may be set to a high value during battery mode in order to increase touch sensitivity.

The touch sensitivity may be improved through the correction of the sensed value described above.

In particular, in the case where the amplitude of the actual touch driving signal (TDS) applied to the touch electrode (TE) is reduced compared to the amplitude of the touch driving signal (TDS) output from the touch power integrated circuit 230 in the battery mode (BM), the operation of performing the touch algorithm by using the corrected sensed value, which is corrected through the correction of the sensed value, may further increase the accuracy of the touch sensitivity.

Various methods for improving the touch sensitivity, and the display device 100 and the touch system 200 for the same have been described above. Hereinafter, the elements included in the touch system 200 will be described.

Figure 17:
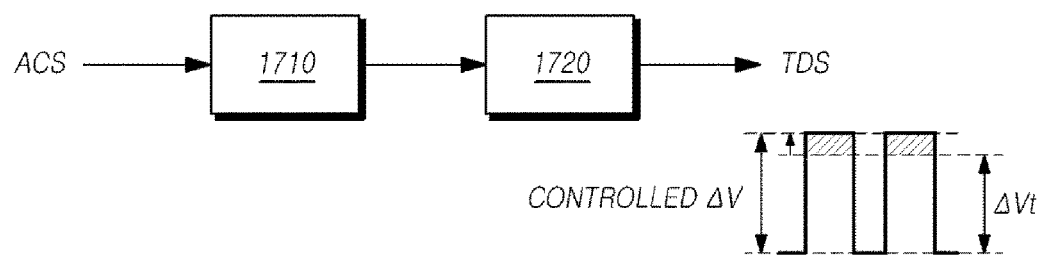
FIG. 17 illustrates a touch power integrated circuit, according to the present embodiments.

FIG. 17 illustrates the touch power integrated circuit 230, according to the present embodiments.

Referring to FIG. 17, the touch power integrated circuit 230, according to the present embodiments, may create the touch driving signal (TDS) to drive the touch electrode (TE), and may include a signal generating unit 1710 that generates the touch driving signals (TDS) that have different amplitudes according to the power mode (PM) and a signal supplying unit 1720 that supplies the created touch driving signals (TDS) to the touch circuit 210.

Since the touch driving signals (TDS) having different amplitudes may be intentionally varied according to the power mode (PM) by using the touch power integrated circuit 230 above, the reduction in the amplitude of the touch driving signal (TDS), or the touch sensitivity deviation thereof according to the power mode (PM), may be prevented, and thus, the degradation of the touch sensitivity or the touch sensitivity deviation depending on the power mode (PM) may be prevented in order to thereby improve the touch sensitivity.

The signal generating unit 1710 described above may receive the amplitude control signal (ACS), which contains at least one piece of the power mode (PM) information or the amplitude control amount information, from the micro-control unit 220, and may create the touch driving signal (TDS).

When the power mode (PM) is changed, the signal generating unit 1710 mentioned above may change the amplitude of the touch driving signal (TDS) step by step to then be output to the touch circuit 210.

More specifically, when the power mode (PM) switches from the adapter mode (AM) to the battery mode (BM), the signal generating unit 1710 may increase the amplitude (ΔVac) of the touch driving signal (TDS) to the amplitude (ΔVbc) corresponding to the battery mode (BM) through one or more intermediate amplitudes (ΔVi) whenever creating the touch driving signal (TDS).

When the power mode (PM) switches from the battery mode (BM) to the adapter mode (AM), the signal generating unit 1710 may decrease the amplitude (ΔVbc) of the touch driving signal (TDS) to the amplitude (ΔVac) corresponding to the adapter mode (AM) through one or more intermediate amplitudes (ΔVd) whenever creating the touch driving signal (TDS).

As described above, with regard to the creation of the touch driving signal (TDS), the signal generating unit 1710 may create the touch driving signal (TDS), which has the amplitude that changes step by step, through the phased change in the amplitude when the power mode switches, in order to thereby prevent an abrupt change in the amplitude of the touch driving signal (TDS) according to the change in the power mode so that stability of the touch sensing may be improved.

Figure 18:
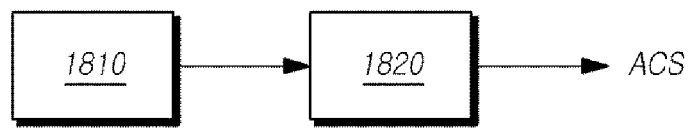
FIG. 18 illustrates a micro-control unit, according to the present embodiments.

FIG. 18 illustrates the micro-control unit 220, according to the present embodiments.

Referring to FIG. 18, the micro-control unit 220, according to the present embodiments, may include a power mode recognition unit 1810 that detects the power mode (PM) and a control unit 1820 that outputs, to the touch power integrated circuit 230, the amplitude control signal (ACS) that controls the touch power integrated circuit 230 to create the touch driving signals (TDS) that have different amplitudes depending on the power mode (PM).

The touch power integrated circuit 230 may detect the power mode (PM) in order to control (adjust) the amplitude of the touch driving signal (TDS) according to the power mode by using the aforementioned micro-control unit 220.

The amplitude control signal (ACS) mentioned above may contain at least one piece of power mode information (power mode change information) or the amplitude control amount information (amplitude-increased amount information or amplitude-reduced amount information).

The power mode recognition unit 1810 mentioned above may detect the power mode (PM) to be one of the adapter mode (AM) or the battery mode (BM) based on the input power voltage (VLED) of the backlight driver.

As described above, when the input power voltage (VLED) of the backlight driver is identified, the power mode recognition unit 1810 may detect the power mode (PM) to be one of the adapter mode (AM) or the battery mode (BM). The power mode recognition unit 1810 may efficiently detect the power mode (PM) by using the power system environment in the display device 100.

In addition, the power mode recognition unit 1810 may receive the power mode information from the power system 410 in order to thereby detect the power mode (PM) to be one of the adapter mode (AM) or the battery mode (BM).

As described above, since the micro-control unit 220 may receive the power mode information from the power system 410, which can directly identify the supply of the power through the adapter 412, to detect the power mode (PM), it may be easy to detect the power mode.

Meanwhile, when the power mode (PM) is detected to be the battery mode (BM), the control unit 1820 of the micro-control unit 220 may create and output an amplitude control signal the (ACS) for increasing the amplitude of the touch driving signal (TDS).

Accordingly, the touch driving signal (TDS) that has the greater amplitude (ΔVbc) may be created in the battery mode (BM), compared to the adapter mode (AM), so that the reduction in the amplitude of the touch driving signal (TDS), which occurs in the course of transmitting the touch driving signal (TDS), may be compensated, and thus, the touch sensitivity in the battery mode (BM) may be improved.

Meanwhile, in consideration of the change in the power mode, when the power mode (PM) is detected to change from the adapter mode (AM) to the battery mode (BM), the control unit 1820 may output an amplitude control signal (ACS) for increasing the amplitude of the touch driving signal (TDS).

In addition, when the power mode (PM) is detected to change from the battery mode (BM) to the adapter mode (AM), the control unit 1820 may output an amplitude control signal (ACS) for reducing the amplitude of the touch driving signal (TDS).

According to the description above, the effective amplitude control may be performed to conform to the power mode changing situation in order to thereby provide an excellent touch sensitivity in any power mode changing situation.

Meanwhile, when the power mode (PM) is detected to change from the adapter mode (AM) to the battery mode (BM), the control unit 1820 may output an amplitude control signal (ACS) that allows the amplitude of the touch driving signal (TDS) to increase to the amplitude (ΔVbc) corresponding to the battery mode (BM) through one or more intermediate amplitudes (ΔVi).

When the power mode (PM) is detected to change from the battery mode (BM) to the adapter mode (AM), the control unit 1820 may output an amplitude control signal (ACS) that allows the amplitude of the touch driving signal to decrease to the amplitude (ΔVac) corresponding to the adapter mode (AM) through one or more intermediate amplitudes (ΔVd).

By using the aforementioned micro-control unit 220, an abrupt change in the amplitude of the touch driving signal (TDS) may be prevented through the phased change in the amplitude so that the instability of the touch sensing may be mitigated.

Meanwhile, the control unit 1820 may determine the amplitude-increased amount information or amplitude-reduced amount information based on the touch sensing signal (TSS) received through the touch electrode (TE) to which the touch driving signal (TDS) is applied, and may create and output an amplitude control signal (ACS) that contains the determined amplitude-increased amount information or amplitude-reduced amount information.

As described above, it may be whether or not the amplitude of the actual touch driving signal (TDS) applied to the touch electrode (TE) reaches a desired amplitude (ΔVt) as a result of the amplitude control is detected, through the touch sensing signal (TSS), in order to thereby re-adjust the amplitude of the actual touch driving signal (TDS) applied to the touch electrode (TE) until it reaches the desired amplitude (ΔVt). According to this, it is possible to make an accurate amplitude control so that the touch sensitivity may be further improved.

Figure 19:
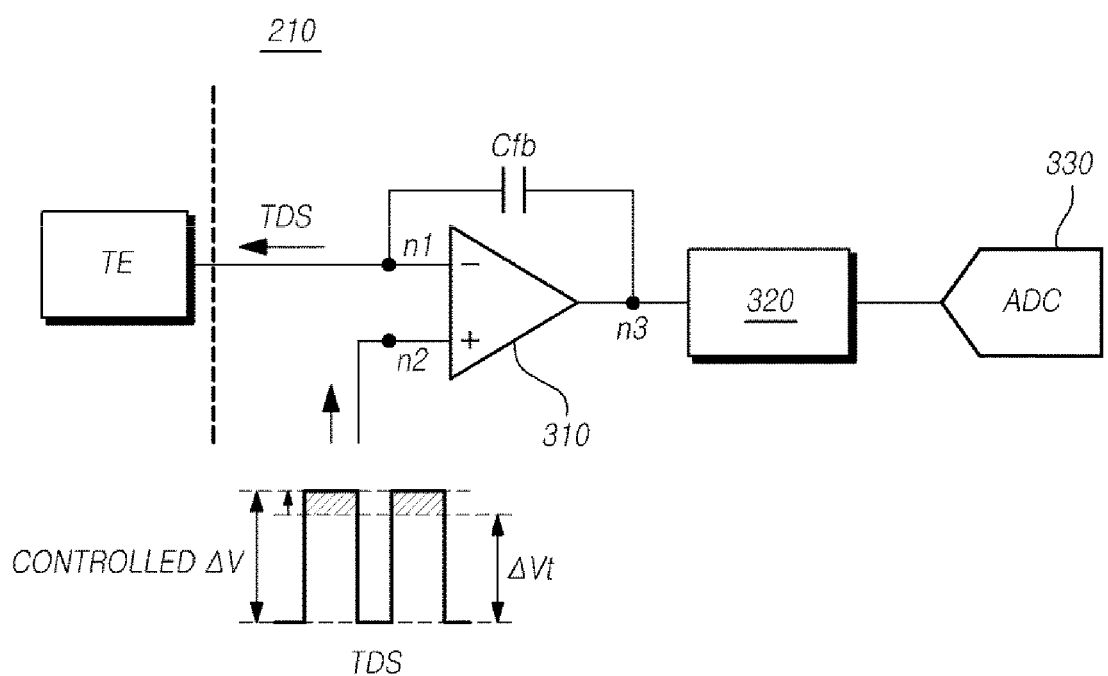
FIG. 19 illustrates a touch circuit, according to the present embodiments.

FIG. 19 illustrates the touch circuit 210, according to the present embodiments.

Referring to FIG. 19, the touch circuit 210, according to the present embodiments, may include the amplifier 310, the integrator circuit 320, the analog-to-digital converter 330, and the feedback capacitor (Cfb).

The amplifier 310 is comprised of: the first terminal (n1) that is electrically connected with the touch electrode (TE); the second terminal (n2) to which the touch driving signal (TDS) is applied; and the output terminal (n3) that outputs the touch sensing signal (TSS).

The feedback capacitor (Cfb) is connected between the first terminal (n1) and the output terminal (n3) of the amplifier 310.

The feedback capacitor (Cfb) may be a fixed capacitor that has a fixed capacitance, or may be a variable capacitor that has a variable capacitance.

In addition, the feedback capacitor (Cfb) may be comprised of a plurality of capacitors. In the case where the feedback capacitor (Cfb) is the variable capacitor, it may be comprised of a plurality of capacitors and a plurality of switches.

The integrator circuit 320 outputs an integral value of the output voltage of the amplifier 310 {that is, the touch sensing signal that is output from the output terminal (n3) of the amplifier 310}. Such an integrator circuit 320 may be comprised of devices, such as comparators or capacitors.

The analog-to-digital converter (ADC) 330 converts the output voltage (the integral value) of the integrator circuit 320 into a digital value, and outputs the same as a sensed value.

The touch driving signals (TDS), which are input to the second terminal (n2) of the amplifier 310, have amplitudes (ΔV) controlled by the touch power integrated circuit 230.

In addition, the touch driving signals (TDS), which are input to the second terminal (n2) of the amplifier 310, have different amplitudes depending on the power mode (PM).

By using the aforementioned touch circuit 210, the touch drive may be performed by using the touch driving signals (TDS) that are intentionally created to have different amplitudes depending on the power mode (PM), so that the reduction in the amplitude of the touch driving signal (TDS) or the amplitude reduction deviation depending on the power mode (PM) may be prevented in order to thereby improve the touch sensitivity.

Such a touch circuit 210 may be included in the driving integrated circuit together with a data driving circuit.

This will be described with reference to FIG. 20.

Figure 20:
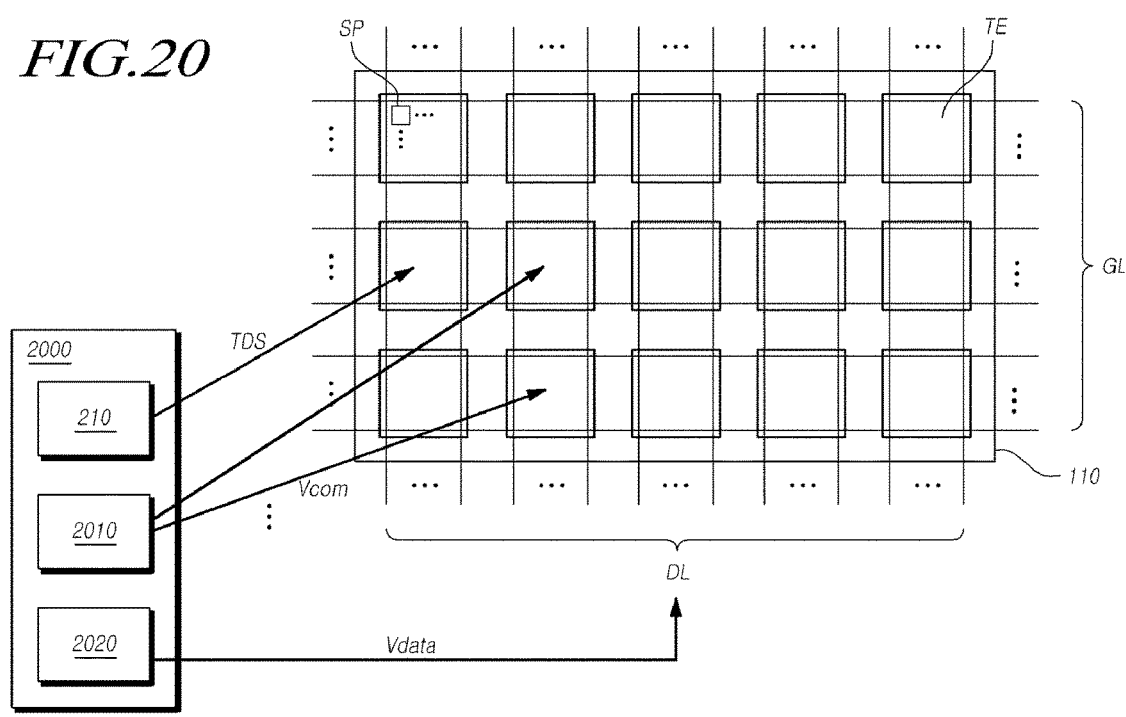
FIG. 20 illustrates a driving integrated circuit, according to the present embodiments.

FIG. 20 is a view illustrating a driving integrated circuit 2000, according to the present embodiments.

The driving integrated circuit 2000 in FIG. 20, according to the present embodiments, may include: a touch circuit 210 that receives the touch driving signals (TDS), which have different amplitudes according to the power mode (PM), and sequentially outputs the same to a plurality of touch electrodes (TE) embedded in the display panel 110 in the touch mode period; a common voltage supply circuit 2010 that supplies a common voltage (Vcom) to the plurality of touch electrodes (TE) in the display mode period; and a data driving circuit 2020 that drives a plurality of data lines (DL) disposed in the display panel 110 in the display mode period.

The aforementioned driving integrated circuit 2000 is an integrated circuit in the form of a combination of the source driver integrated circuit 450 of FIG. 4 and the touch circuit 210.

In the case of using the driving integrated circuit 2000, there is no need to separately provide the source driver integrated circuit 450 for driving the display, such as the data driving, and the touch integrated circuit for the touch driving and sensing, in order to thereby reduce the number of components.

In particular, in the case where the touch electrode (TE) is the mode common electrode that is used in both the display mode and the touch mode, the driving integrated circuit 2000 in an integrated form may provide the display driving and the touch driving more effectively.

The present embodiments, as described above, can provide a differentiated touch drive according to the power mode in order to thereby improve the touch sensitivity.

In addition, according to the present embodiments, when the power mode corresponds to the battery mode, the degradation of the touch sensitivity can be prevented.

Furthermore, according to the present embodiments, when the power mode switches, the touch sensitivity can be improved through an adaptive touch drive.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A display device comprising:
   a display panel having one or more touch electrodes embedded therein;
   a first circuit to generate a touch driving signal at an output of the first circuit, wherein at the output of the first circuit the touch driving signal has a first amplitude during a first power mode and a second amplitude different than the first amplitude during a second power mode; and
   a second circuit having an input coupled to the output of the first circuit, the second circuit to provide the touch driving signal to the one or more touch electrodes, wherein the first power mode is a battery power mode in which a battery supplies power to the display device and the second power mode is an adapter power mode in which a power adapter supplies power to the display device, and the first amplitude of the touch driving signal at the output of the first circuit during the battery power mode is greater than the second amplitude of the touch driving signal at the output of the first circuit during the adapter power mode.

2. The display device of claim 1, further comprising:
   a backlight driver having an input power voltage,
   wherein the first power mode corresponds to when the input power voltage is a first voltage level, and the second power mode corresponds to when the input power voltage is a second voltage level different than the first voltage level.

3. The display device of claim 1, wherein, when the display device switches from the first power mode to the second power mode, the first circuit initially generates the touch driving signal to have, at the output of the first circuit, an intermediate amplitude between the first amplitude and the second amplitude, and then generates the pulse signal to have the second amplitude at the output of the first circuit.

4. The display device of claim 3, wherein, when the display device switches from the second power mode to the first power mode, the first circuit initially generates the touch driving signal to have the intermediate amplitude at the output of the first circuit, and then generates the touch driving to have the first amplitude at the output of the first circuit.

5. The display device of claim 1, wherein the first circuit controls an amplitude of the touch driving signal based on an amplitude control signal, and the display device further comprises:
   a third circuit that detects whether the display device is in the first power mode or the second power mode, and generates the amplitude control signal based on whether the display device is in the first power mode or the second power mode.

6. The display device of claim 5, wherein the third circuit detects whether the display device is in the first power mode or the second power mode based on an input power voltage of a backlight driver.

7. The display device of claim 5, wherein the second circuit comprises:
   an amplifier including a first terminal electrically connected with the touch electrode, a second terminal to receive the touch driving signal, and an output terminal;
   an integrator circuit configured to output an integral value of a voltage of the output terminal; and
   an analog-to-digital converter configured to convert an output voltage of the integrator circuit into a digital value,
   wherein the third circuit generates the amplitude control signal further based on the digital value.

8. The display device of claim 5, wherein the second circuit comprises:

an amplifier including a first terminal electrically connected with the touch electrode, a second terminal to receive the touch driving signal, and an output terminal;

a feedback capacitor connected between the first terminal and the output terminal;

an integrator circuit configured to output an integral value of a voltage of the output terminal; and an analog-to-digital converter configured to convert an output voltage of the integrator circuit into a digital value, wherein the third circuit generates the capacitance control signal for controlling the capacitance of the feedback capacitor.

9. The display device of claim 5, wherein the second circuit comprises:

an amplifier including a first terminal electrically connected with the touch electrode, a second terminal to receive the touch driving signal, and an output terminal;

an integrator circuit configured to output an integral value of a voltage of the output terminal; and an analog-to-digital converter configured to convert an output voltage of the integrator circuit into a digital value, wherein the third circuit generates an integrator control signal for controlling a number of integration times of the integrator circuit.

10. The display device of claim 5, wherein the second circuit comprises:

an amplifier including a first terminal electrically connected with the touch electrode, a second terminal to receive the touch driving signal, and an output terminal;

an integrator circuit configured to output an integral value of a voltage of the output terminal; and an analog-to-digital converter configured to convert an output voltage of the integrator circuit into a digital value, wherein the third circuit adds a correction value to a value output from the analog-to-digital converter to generate a corrected value and generates touch coordinates based on the corrected value, the correction value generated to have a first value during the first power mode and a second value during the second power mode.

11. A driver circuit for driving a touch sensitive display device including a display panel having one or more touch electrodes embedded therein, the driving circuit comprising:

a first circuit to generate a touch driving signal at an output of the first circuit, wherein at the output of the first circuit the touch driving signal has a first amplitude during a first power mode and a second amplitude different than the first amplitude during a second power mode; and a second circuit having an input coupled to the output of the first circuit, the second circuit to provide the touch driving signal to the one or more touch electrodes, wherein the first power mode is a battery power mode in which a battery supplies power to the touch sensitive display device and the second power mode is an adapter power mode in which a power adapter supplies power to the touch sensitive display device, and the first amplitude of the touch driving signal at the output of the first circuit during the battery power mode is greater than the second amplitude of the touch driving signal at the output of the first circuit during the adapter power mode.

12. The driver circuit of claim 11, wherein the first power mode corresponds to when an input power voltage of a backlight driver is a first voltage level, and the second power mode corresponds to when the input power voltage is a second voltage level different than the first voltage level.

13. The driver circuit of claim 11, wherein, when switching from the first power mode to the second power mode, the first circuit initially generates the touch driving signal to have, at the output of the first circuit, an intermediate amplitude between the first amplitude and the second amplitude, and then generates the touch driving signal to have the second amplitude at the output of the first circuit.

14. The driver circuit of claim 13, wherein, when switching from the second power mode to the first power mode, the first circuit initially generates the touch driving signal to have the intermediate amplitude at the output of the first circuit, and then generates the touch driving signal to have the first amplitude at the output of the first circuit.

15. The driver circuit of claim 11, wherein the first circuit controls an amplitude of the touch driving signal based on an amplitude control signal, and the display device further comprises:

a third circuit that detects whether the display device is in the first power mode or the second power mode, and generates the amplitude control signal based on whether the display device is in the first power mode or the second power mode.

16. The driver circuit of claim 15, wherein the third circuit detects whether the display device is in the first power mode or the second power mode based on an input power voltage of a backlight driver.

17. The driver circuit of claim 15, wherein the second circuit comprises:

an amplifier including a first terminal electrically connected with the touch electrode, a second terminal to receive the touch driving signal, and an output terminal;

an integrator circuit configured to output an integral value of a voltage of the output terminal; and an analog-to-digital converter configured to convert an output voltage of the integrator circuit into a digital value, wherein the third circuit generates the amplitude control signal further based on the digital value.

18. The driver circuit of claim 15, wherein the second circuit comprises:

an amplifier including a first terminal electrically connected with the touch electrode, a second terminal to receive the touch driving signal, and an output terminal;

a feedback capacitor connected between the first terminal and the output terminal;

an integrator circuit configured to output an integral value of a voltage of the output terminal; and an analog-to-digital converter configured to convert an output voltage of the integrator circuit into a digital value, wherein the third circuit generates the capacitance control signal for controlling the capacitance of the feedback capacitor.

19. The driver circuit of claim 15, wherein the second circuit comprises:

an amplifier including a first terminal electrically connected with the touch electrode, a second terminal to receive the touch driving signal, and an output terminal;

an integrator circuit configured to output an integral value of a voltage of the output terminal; and an analog-to-digital converter configured to convert an output voltage of the integrator circuit into a digital value, wherein the third circuit generates an integrator control signal for controlling a number of integration times of the integrator circuit.

20. The driver circuit of claim 15, wherein the second circuit comprises:

an amplifier including a first terminal electrically connected with the touch electrode, to receive the touch driving signal, and an output terminal;

an integrator circuit configured to output an integral value of a voltage of the output terminal; and an analog-to-digital converter configured to convert an output voltage of the integrator circuit into a digital value, wherein the third circuit adds a correction value to a value output from the analog-to-digital converter to generate a corrected value and generates touch coordinates based on the corrected value, the correction value generated to have a first value during the first power mode and a second value during the second power mode.

21. A method of driving a touch sensitive display device including a display panel having one or more touch electrodes embedded therein, the method comprising:

generating a touch driving signal at an output of a first circuit, wherein at the output of the first circuit the touch driving signal has a first amplitude during a first power mode and a second amplitude different than the first amplitude during a second power mode; and providing, by a second circuit having an input coupled to the output of the first circuit, the touch driving signal to the one or more touch electrodes, wherein the first power mode is a battery power mode in which a battery supplies power to the touch sensitive display device and the second power mode is an adapter power mode in which a power adapter supplies power to the touch sensitive display device, and the first amplitude of the touch driving signal at the output of the first circuit during the battery power mode is greater than the second amplitude of the touch driving signal at the output of the first circuit during the adapter power mode.

* * * * *